(12) United States Patent
Saito et al.

(10) Patent No.: US 8,673,797 B2
(45) Date of Patent: Mar. 18, 2014

(54) BINDER FOR MONOLITHIC REFRACTORIES AND MONOLITHIC REFRACTORY

(75) Inventors: Yoshitoshi Saito, Tokyo (JP); Atsunori Koyama, Omuta (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 77 days.

(21) Appl. No.: 12/998,440

(22) PCT Filed: Oct. 26, 2009

(86) PCT No.: PCT/JP2009/005642
§ 371 (c)(1),
(2), (4) Date: Jun. 30, 2011

(87) PCT Pub. No.: WO2010/047136
PCT Pub. Date: Apr. 29, 2010

(65) Prior Publication Data
US 2011/0251045 A1    Oct. 13, 2011

(30) Foreign Application Priority Data
Oct. 24, 2008    (JP) ................. 2008-274889

(51) Int. Cl.
*C04B 35/03*    (2006.01)
*C04B 35/00*    (2006.01)
*C01F 11/02*    (2006.01)

(52) U.S. Cl.
USPC ....... 501/125; 501/123; 501/153; 423/594.16

(58) Field of Classification Search
USPC .................. 501/123, 125, 127, 153; 423/600, 423/594.16, 625
See application file for complete search history.

(56) References Cited

U.S. PATENT DOCUMENTS

| 5,811,071 A * | 9/1998 | Emblem et al. ............... 423/596 |
| 8,309,483 B2 * | 11/2012 | Saito et al. .................... 501/124 |
| 2005/0239630 A1 * | 10/2005 | Oba et al. ...................... 501/124 |

FOREIGN PATENT DOCUMENTS

| EP | 0 072 871 A1 | 3/1983 |
| JP | 52-148524 | 12/1977 |
| JP | 56-104783 | 8/1981 |
| JP | 58-26079 | 2/1983 |
| JP | 60-151283 | 8/1985 |
| JP | 64-72959 | 3/1989 |
| JP | 8-198649 | 8/1996 |
| JP | 2000-281455 | 10/2000 |
| JP | 2004-137122 | 5/2004 |
| JP | 2008-290934 | 12/2008 |
| WO | 2010/047136 | 4/2010 |

OTHER PUBLICATIONS

Wang et al. Preparation of nano-sized SrAl2O4 using an amorphous hetero-nucleous complex as a precursor. Journal of Alloys and Compounds 370 (2004) 276-280.*
International Search Report dated Jan. 12, 2010 issued in corresponding PCT Application No. PCT/JP2009/005642.

(Continued)

Primary Examiner — Kaj K Olsen
Assistant Examiner — Noah Wiese
(74) Attorney, Agent, or Firm — Kenyon & Kenyon LLP

(57) ABSTRACT

The binder for monolithic refractories according to the present invention includes $SrAl_2O_4$; $SrAl_2O_4$ and 5 mass % or less of the remainder; or a mixture of $SrAl_2O_4$ and $Al_2O_3$.

11 Claims, 6 Drawing Sheets

(56) References Cited

OTHER PUBLICATIONS

Ito et al., " Strength of the Hardened Mortars of Sr-substituted $CaAl_2O_4$-type Solid Solution" Yogyo-Kyokai-Shi vol. 10, No. 89, 1981, pp. 572-577.
European Search Report dated Nov. 29, 2011 in European Patent Application No. 09821836.5.
Carlson, E.T., "A tudy of Some Strontium Aluminatcs and Calcium-Strontium Aluminatc Solid Solutions," Journal of Research of the National Bureau of Standards, vol. 54, No. 6, Jun. 1955, Research Paper 2595, Dec. 1954, pp. 329-334.
Chatterjee, A.K., "Re-examining the prospects of aluminous cements based on alkali-earth and rare-earth oxides," Cement and Concrete Research 39 (2009) 981-988.
Vishista, K. et al., "Microstructural development of $SrAl_{12}O_{19}$ in alumina-strontia composites," Journal of the European Ceramic Society 29 (2009) 77-83.
Chinese Office Action dated Jan. 29, 2013, issued in corresponding Chinese Application No. CN 200980141947.1, and an English translation of the Search Report only.
Japanese Office Action dated Feb. 19, 2013, issued in corresponding Japanese Application No. 2009-244466, and a partial English translation thereof.

\* cited by examiner

BINDER FOR MONOLITHIC REFRACTORIES AND MONOLITHIC REFRACTORY

This application is a national stage application of International Application No. PCT/JP2009/005642, filed Oct. 26, 2009, which claims priority to Japanese Patent Application No. 2008-274889, filed Oct. 24, 2008, the content of which is incorporated herein by reference.

BACKGROUND OF THE INVENTION

1. Field of the Invention

The present invention relates to a binder for monolithic refractories, which is used for the lining or repair of kilns, and a monolithic refractory using the binder for monolithic refractories.

Priority is claimed on Japanese Patent Application No. 2008-274889, filed Oct. 24, 2008, the content of which is incorporated herein by reference.

2. Description of Related Art

As a binder for the lining refractories of kilns used for a variety of high temperature processes, best exemplified by steel processes, a number of organic and inorganic compounds, such as sodium phosphate, sodium silicate, a furan resin, a phenol resin, pitch, aluminum lactate, sodium aluminate, silica sol, alumina sol, polyvinyl alcohol, methylcellulose, carboxymethylcellulose, ethylsilicate, alumina cement, hydraulic alumina, or the like, are used.

In recent years, refractories have become unshaped for improvement in constructability, ease of repair, or the like, and monolithic refractories have become widely used even in parts that come into contact with molten iron or high temperature slag, for which shaped bricks were used in the past.

The manufacture of monolithic refractories does not include a high pressure press, which is performed in the manufacture of shaped refractories. Therefore, the characteristics of raw materials or binders are important. Among them, alumina cement (major chemical compounds: $CaO.Al_2O_3$, $CaO.2Al_2O_3$, $12CaO.7Al_2O_3$) is used for a wide range of uses as a binder for refractories of a gutter, a ladle, a tundish, or the like.

Furthermore, investigation are also ongoing with alumina-based binders including chemical components other than $CaO$—$Al_2O_3$.

For example, Japanese Unexamined Patent Application, First Publication No. S52-148524 discloses mixtures of raw materials for the manufacture of refractory alumina cement including barium or strontium and alumina as the main chemical components. Specifically, the mixtures of raw materials for the manufacture of cement are obtained by appropriately performing a thermal treatment on mixtures of carbonates and chlorides.

Japanese Unexamined Patent Application, First Publication No. S58-26079 and Japanese Unexamined Patent Application, First Publication No. S56-104783 disclose castable mixtures with good high-temperature strength, for which strontium aluminate is used as a binder.

Itoh, Mizuno, Kono, Suzuki: Journal of the Ceramic Society of Japan, 89, 10, P. 572-577, 1981 discloses a material produced by adding a commercial high-purity reagent to $CaO$—$SrO$—$Al_2O_3$-based cement and then mixing and firing the mixture, which shows a property of being hardened with an addition of water.

In addition, Japanese Unexamined Patent Application, First Publication No. S56-104783 discloses a binder for monolithic refractories using mixtures of raw materials for the manufacture of cement having $CaO$—$SrO$—$Al_2O_3$ composition, which shows improved high-temperature slag resistance, compared to binders with $CaO$—$Al_2O_3$ composition.

Patent Citation 1

Japanese Unexamined Patent Application, First Publication No. S52-148524

Patent Citation 2

Japanese Unexamined Patent Application, First Publication No. S58-26079

Patent Citation 3

Japanese Unexamined Patent Application, First Publication No. S56-104783

Patent Citation 4

Japanese Unexamined Patent Application, First Publication No. 2008-290934

Non Patent Citation 1

Itoh, Mizuno, Kono, Suzuki: Journal of the Ceramic Society of Japan, 89, 10, P. 572-577, 1981

However, the demand for improvement in steel quality tends to make conditions, such as operation temperature, or the like, more severe and thus high temperature corrosion resistance, or the like continuously becomes insufficient in conventional binders. Compared to chemical components in refractory aggregates for monolithic refractories, binders including $CaO$—$Al_2O_3$-based alumina cement, which are generally used, have problems in that they are liable to form low melting point materials due to ferric oxides in molten iron or slag, and wear or infiltration proceeds from binder portions in refractories, which makes it impossible to sufficiently develop the intrinsic tolerance of chemical components in the refractory aggregates.

That is, Japanese Unexamined Patent Application, First Publication No. S52-148524 supplies the mixtures of raw materials for the manufacture of refractory alumina cement including barium carbonate or strontium carbonate, alumina, and chlorides of the above metals or potassium chloride or sodium chloride as the main chemical components, and studies the strength, or the like of hydraulic clinker materials using the mixtures of raw materials. However, the compressive strength is not sufficiently developed after 3 days and 7 days after the manufacture and eventually reaches the maximum on the $28^{th}$ day after the manufacture.

Generally, monolithic refractories are subjected to drying and heating 1 day after the manufacture and are often placed under the operating environment. From such a viewpoint, development of the maximum strength within 24 hours is strongly required. As a result, binders whose maximum strength is eventually developed on the $28^{th}$ day after manufacture cannot be adopted for monolithic refractories.

In addition, Japanese Unexamined Patent Application, First Publication No. S52-148524 is not clear about corrosion resistance with respect to high temperature molten iron or slag and shows nothing about methods for the application to monolithic refractories with excellent high temperature corrosion resistance.

In addition, Japanese Unexamined Patent Application, First Publication No. S58-26079 and Japanese Unexamined Patent Application, First Publication No. S56-104783 supply heat-insulating castable mixtures using strontium aluminate as a binder, with which heat-insulating materials with high temperature strength can be obtained. However, the documents are about heat-insulating uses for which the mixtures are lined on the rear surface of kilns, and therefore they are not clear about corrosion resistance with respect to high temperature molten iron or slag, which is an essential characteristic for the wear lining of kilns. Regarding refractories used not only for heat-insulating castable but also for non heat-insulating uses, the documents describe nothing about indispensable characteristics for the manufacture of refractories, such as the flow property, curing time or cured strength, drying characteristics or explosion resistance, or the like of the kneaded objects thereof. Furthermore, Japanese Unexamined Patent Application, First Publication No. S58-26079 uses the generic name of complex oxides consisting of strontium and aluminum, called strontium aluminate, in the claims and, even in the embodiments, simply shows the mixtures of $SrO.Al_2O_3$, $SrO.2Al_2O_3$, and $SrO.6Al_2O_3$. In addition, in the complex oxides consisting of stronitium and aluminum, nothing is described about chemical composition, crystallite diameter, or the like appropriate for binders.

In addition, Itoh, Mizuno, Kono, Suzuki: Journal of the Ceramic Society of Japan, 89, 10, P. 572-577, 1981 shows that $CaO$—$SrO$—$Al_2O_3$-based cement is produced and the strength of hardened bodies becomes extremely great at an amount of Sr-substitution of from 0.3 mol to 0.4 mol. However, the document discloses nothing about high temperature characteristics of higher than 1000° C., and also shows nothing about methods for the application to monolithic refractories with excellent high temperature corrosion resistance.

Due to the above limitations, as binders for monolithic refractories in actual industrial uses, alumina cement including $CaO.Al_2O_3$, as the major chemical component, $\alpha$-$Al_2O_3$ or $CaO.2Al_2O_3$, $12CaO.7Al_2O_3$ and a variety of additives are used.

That is, as of now, examples of alumina cement used as binders for monolithic refractories include "high alumina cement ES," "high alumina cement VS-2," "high alumina cement super 90," "high alumina cement super G," "high alumina cement super 2," "high alumina cement super,", or the like (all product names, manufactured by Denki Kagaku Kogyo Kabushiki Kaisha); "SECAR 71," "SECAR 80", or the like (all product names, manufactured by Kerneos Inc.); or the like. Any of the above includes $CaO.Al_2O_3$, as the major chemical component, $\alpha$-$Al_2O_3$ or $CaO.2Al_2O_3$, $12CaO.7Al_2O_3$, and a small amount of additives depending on required characteristics.

As a result, there has been a strong demand for the development of binders for monolithic refractories with excellent corrosion resistance with respect to high temperature molten iron or slag because conditions such as operation temperature continuously become more severe.

Further, Japanese Unexamined Patent Application, First Publication No. 2008-290934 shows that high temperature slag resistance is further enhanced by using binders using mixtures of raw materials for the manufacture of cement having a $CaO$—$SrO$—$Al_2O_3$ composition. However, hardened strength developing performance, which is an important characteristic of monolithic refractories imparted by binders, remains in a similar level to that of the conventional technology, and therefore there is a demand for performance improvement.

SUMMARY OF THE INVENTION

The present invention has been made in consideration of the above problems, and the object of the present invention is to provide a binder for monolithic refractories and a monolithic refractory having excellent high temperature corrosion resistance with respect to slag, molten iron, or the like, excellent constructability and high temperature stability, and, furthermore, excellent hardened strength developing performance, compared to alumina cement in the conventional technology.

In order to solve the above problems and thus achieve the related object, the present invention has adopted the following.

(1) A binder for monolithic refractories according to the present invention consists of $SrAl_2O_4$.

(2) Another binder for monolithic refractories according to the present invention includes $SrAl_2O_4$ and 5 mass % or less of the remainder.

(3) The other binder for monolithic refractories according to the present invention includes $Al_2O_3$ mixed with $SrAl_2O_4$.

(4) The binder for monolithic refractories according to (3), wherein from 10 mass % to 60 mass % of $SrAl_2O_4$ and from 40 mass % to 90 mass % of $Al_2O_3$ may be mixed.

(5) The binder for monolithic refractories according to (3), wherein from 20 mass % to 50 mass % of $SrAl_2O_4$ and from 50 mass % to 80 mass % of $Al_2O_3$ may be mixed.

(6) The binder for monolithic refractories according to any one of (1) to (5), wherein at least either a dispersant or a hardening retardant may be mixed in the binder for monolithic refractories.

(7) The binder for monolithic refractories according to any one of (1) to (5), wherein the crystallite diameter of $SrAl_2O_4$ in the binder for monolithic refractories may be from 40 nm to 80 nm.

(8) The binder for monolithic refractories according to any one of (1) to (5), wherein the amount of $Sr_3Al_2O_6$ mixed as an inevitable impurity in the binder for monolithic refractories may be 3 parts by mass or less with respect to 100 parts by mass of $SrAl_2O_4$.

(9) The monolithic refractory according to the present invention included by mixing the binder for monolithic refractories according to any one of (1) to (5) and a refractory aggregate including ultrafine alumina powder with a particle diameter of 1 μm or less.

(10) The monolithic refractory according to (9), wherein the amount of the binder for monolithic refractories may be from 0.2 parts by mass to 20 parts by mass with respect to 100 parts by mass of the total amount of the binder for monolithic refractories and the refractory aggregate.

(11) The monolithic refractory according to (9), wherein the amount of the binder for monolithic refractories may be from 0.5 parts by mass to 12 parts by mass with respect to 100 parts by mass of the total amount of the binder for monolithic refractories and the refractory aggregate.

(12) The monolithic refractory according to (9), wherein at least one of a dispersant, a hardening retardant and a hardening accelerator may be added.

(13) The monolithic refractory according to (12), wherein a hardening accelerator may be further added.

(14) The monolithic refractory according to (12) or (13), wherein the dispersant may be at least one selected from a group consisting of a polycarbonate-based dispersant, a phosphate-based dispersant, oxycarboxylic acid, a melamine-based dispersant, a naphthalene-based dispersant, and a lignin sulfonic acid-based dispersant; the hardening accelerator may be at least either lithium salt or aluminate; and the hardening retardant may be at least boric acid group or silicofluoride.

(15) A construction method of monolithic refractories according to the present invention includes mixing and kneading the binder for monolithic refractories according to any one of (1) to (5) and a refractory aggregate including ultrafine alumina powder with a particle diameter of 1 μm or less to obtain a monolithic refractory, and constructing the monolithic refractory.

According to the binder for monolithic refractories of the present invention, since greater strength of hardened bodies can be obtained quicker than alumina cement in the conventional technique, it is possible to expect an excellent strength developing property and improvement in productivity by shortening the curing time. Furthermore, according to the binder for monolithic refractories of the present invention, it is possible to develop the effects of excellent high temperature corrosion resistance with respect to slag, molten iron, or the like and of expansion of the service life of monolithic refractories lined in kilns used at a high temperature.

DETAILED DESCRIPTION OF THE INVENTION

Hereinafter, preferable embodiments of the present invention will be described in detail with reference to the accompanying drawings. Meanwhile, in the specification and the drawings, components with substantially the same function and constitution will be given the same reference symbols, thereby avoiding duplicate descriptions thereof.

The inventors paid attention to $SrAl_2O_4$ as a source for supplying positive ions to water, having a behavior of setting particularly ultrafine particles in monolithic refractories. Additionally, the inventors newly found that $SrAl_2O_4$ has excellent corrosion resistance with respect to slag or molten iron and, furthermore, improves constructability, drying characteristics, and high temperature stability.

Particularly, the combined areas in monolithic refractories (that is, areas in which particles of the refractory aggregate are combined so as to contribute to the development of a predetermined level of strength) are composed of alumina cement, ultrafine raw materials, such as alumina, silica, clay, or the like, all of which are included in the refractory aggregate, and a variety of dispersants, and the dispersion characteristics of ultrafine powder significantly affect the flow property or the like of monolithic refractories.

Multivalent ions ($Sr^{2+}$ and $Al^{3+}$ ions) are eluted from $SrAl_2O_4$ that is added to monolithic refractories. A so-called usable life can be obtained by the ion sequestering ability of a hardening retardant or a dispersant. During the usable life, fine powder remains in a dispersion state so as to keep the flow property, but, at a certain point in time when the threshold is exceeded, agglomeration is started and thus the flow property is gradually lost, thereby reaching a state in which a fixed shape can be sustained. Such a state is called setting. Once setting is finished, mechanical strength increases, which is called hardening, but the boundary between setting and hardening is not clear.

The inventors found that cured strength, at which the frame can be removed, can be developed within a short time by setting caused by multivalent ions eluted from $SrAl_2O_4$, such as $Sr^{2+}$ and $Al^{3+}$ ions. However, it is necessary to be careful about the fact that, if the elution speed from $SrAl_2O_4$ is excessively fast and therefore the concentration of multivalent ions increases within an extremely short time, agglomeration proceeds abruptly, which leads to a problem that it becomes difficult to secure a sufficient amount of operation time for construction. Furthermore, the inventors newly found an optimal range of the crystallite diameter of $SrAl_2O_4$ as a binder of monolithic refractories.

Figure 1:
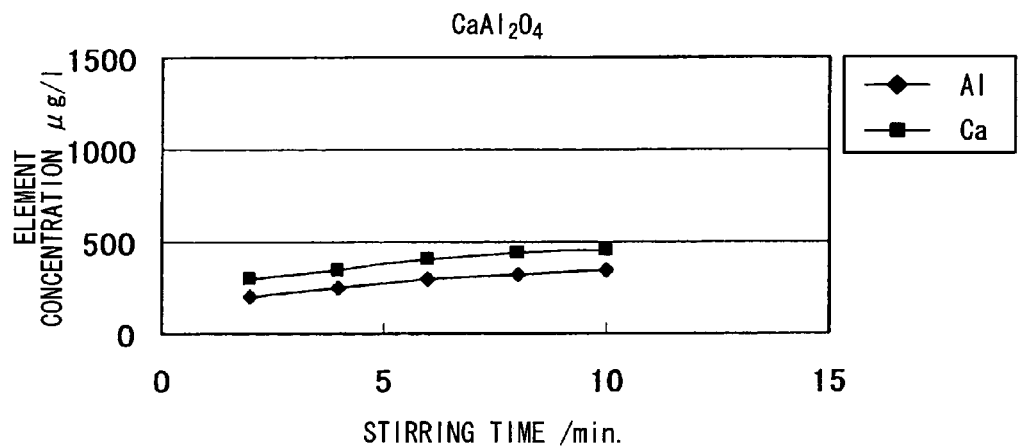
FIG. 1 is a graph showing an example of the elution behavior of Ca ions when $CaAl_2O_4$ is used.
Figure 3:
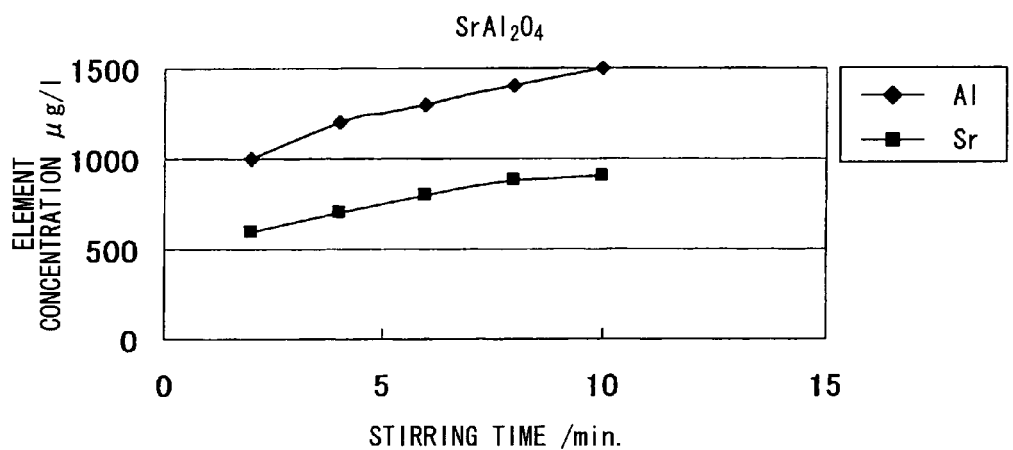
FIG. 3 is a graph showing an example of the elution behavior of Sr ions when $SrAl_2O_4$ is used.

In detail, the rate and amount of Sr ions eluted from $SrAl_2O_4$ into kneading water and the rate and amount of Ca ions eluted from $CaAl_2O_4$, which is the major chemical component of conventional alumina cement were compared. For the comparison, 200 g of a specimen was fed into 400 g of distilled water and stirred for a predetermined period of time using a magnetic stirrer, and then the solution was extracted and analyzed with inductively-coupled plasma (ICP), thereby measuring the amount of elements in the solution. The elements in the solution were presumed to be present in a variety of ion states. As a result, as shown in FIGS. 1 and 3, it was found that the rate and amount of Sr ions eluted from $SrAl_2O_4$ into kneading water are much higher than the rate and amount of Ca ions eluted from $CaAl_2O_4$, which is the major chemical component of conventional alumina cement. Meanwhile, the rate and amount of Al ions eluted are also shown for reference.

Figure 2:
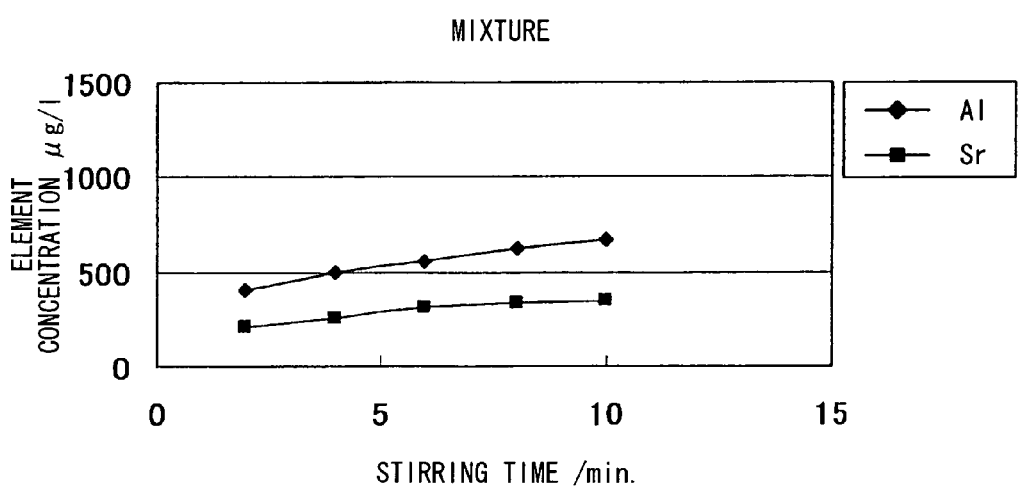
FIG. 2 is a graph showing an example of the elution behavior of Sr ions when a mixture of $SrO.Al_2O_3$, $SrAl_4O_7$ and $CaAl_{12}O_{19}$ is used.

Furthermore, the inventors newly found from the results shown in FIG. 2 or the results shown in the following examples that Sr ions eluted from $SrAl_2O_4$ into water make the aggregates in monolithic refractories agglomerate and combine with each other so as to harden the refractories and develop strength. This mechanism comes from the fact that $Sr^{2+}$ eluted from $SrAl_2O_4$ into water makes the solution (liquid) alkaline. Since the ultrafine alumina ($Al_2O_3$) powder included in the refractory aggregates is a neutral oxide, if the solution becomes alkaline, it becomes easier for the powder to elute into water. As a result, the amount of $Al^{3+}$ in the solution increases. If the amount of eluted ions reaches the saturation range, additional elution becomes difficult, and thus hydrates including Al or Sr or both are precipitated. It can be assumed that the generation of the hydrates in the refractory aggregates forms the combined areas, and therefore cured strength is developed.

In addition, with regard to the mixtures of $SrAl_2O_4$, $SrAl_4O_7$, and $SrAl_{12}O_{19}$ (the mixing ratio is 1:1:1 by the mass ratio) described in the examples in Japanese Unexamined Patent Application, First Publication No. S58-26079 or Japanese Unexamined Patent Application, First Publication No. S56-104783, the rate and amount of Sr ions eluted were confirmed with the same method as above. As a result, as shown in FIG. 2, it was found that, compared to the case of a single compound of $SrAl_2O_4$, the rate and amount of Sr ions eluted from the mixtures of $SrAl_2O_4$, $SrAl_4O_7$, and $SrAl_{12}O_{19}$ were remarkably low.

Figure 4:
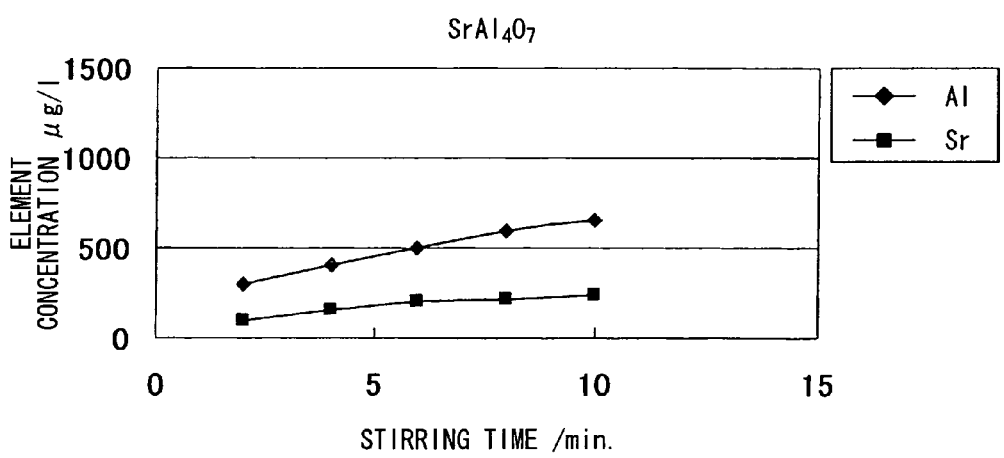
FIG. 4 is a graph showing an example of the elution behavior of Sr ions when $SrAl_4O_7$ is used.
Figure 5:
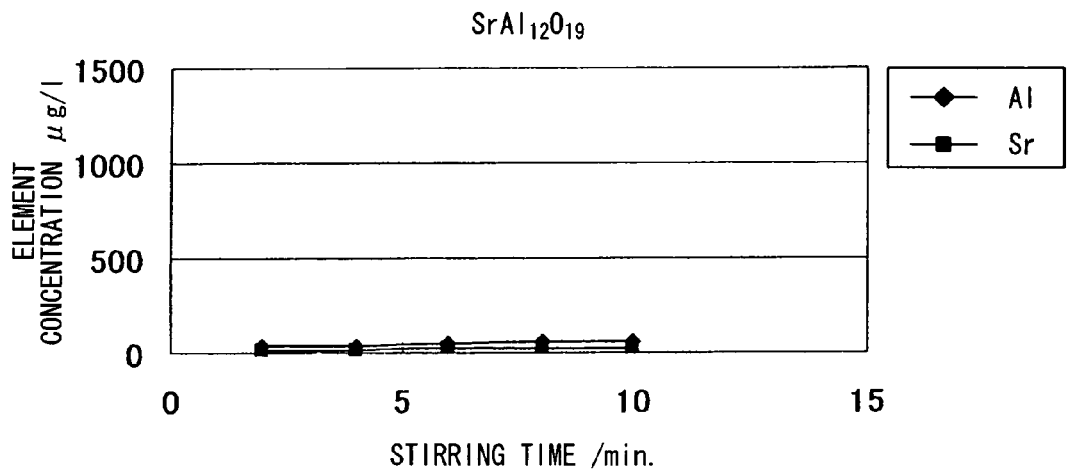
FIG. 5 is a graph showing an example of the elution behavior of Sr ions when $SrAl_{12}O_{19}$ is used.

In order to find the reason of the above fact, the rate and amount of Sr ions eluted from each of $SrAl_4O_7$ and $SrAl_{12}O_{19}$ were confirmed with the same method as above. As a result, it was found that, as shown in FIGS. 3 and 4, the rate and amount of Sr ions eluted from $SrAl_4O_7$ are much lower than those from $SrAl_2O_4$, and, as shown in FIG. 5, the rate and amount of Sr ions eluted from $SrAl_{12}O_{19}$ are further lower, and thereby leading to small contribution to hardening.

Since binders including the chemical components of $SrAl_4O_7$ and $SrAl_{12}O_{19}$ as well as $SrAl_2O_4$ are inferior in their strength developing property to binders including $SrAl_2O_4$ as the major chemical component, in order to obtain a similar strength of monolithic refractories, a larger amount of binder is required. In addition, since binders including the chemical components of $SrAl_4O_7$ and $SrAl_{32}O_{19}$ as well as $SrAl_2O_4$ are inferior in the flow property of monolithic refractories to binders including $SrAl_2O_4$ as the major chemical component, in order to obtain a similar flow property, it is necessary to increase the amount of water added. Such an effect becomes more remarkable in a case in which an increased amount of binder is added to improve a strength developing property.

Due to the above effect, in a case in which binders including the chemical components of $SrAl_4O_7$ and $SrAl_{12}O_{19}$ as well as $SrAl_2O_4$ have a strength developing property similar to that of binders including $SrAl_2O_4$ as the major chemical component, the proportion of binder with a lower melting point than that of aggregates in monolithic refractories increases and also the amount of water added is increased so that hardened bodies have a structure with a high porosity. As a result, there is a problem in that high temperature slag resistance deteriorates and therefore the service life of monolithic refractories is degraded. In addition, since a large amount of binder is required, the amount of raw materials used, such as strontium compounds and alumina, is increased and therefore an increased amount of energy is required to synthesize the chemical components of strontium aluminate, which leads to a rise in manufacturing costs.

As a result, in order to make binders have excellent corrosion resistance with respect to slag or molten iron and to sufficiently develop the functions for monolithic refractories used for lining in kilns used at a high temperature, it is important to include $SrAl_2O_4$ as an essential chemical component and also not to include strontium aluminate with a chemical composition different from $SrAl_2O_4$, such as $SrAl_4O_7$, $SrAl_{12}O_{19}$, or the like as much as possible.

That is, Japanese Unexamined Patent Application, First Publication No. S58-26079 describes that $3SrO.Al_2O_3.6H_2O$ or $Al(OH)_3$, which is generated by hydration from strontium aluminate, has a binding behavior. Certainly, the formation of a dense structure by such hydrates after a long-term curing contributes to strength development, but the inventors found that the effect by Sr ions, a large number of which are eluted from $SrAl_2O_4$ into water, is much more significant.

Based on the above finding, binders for monolithic refractories according to the first embodiment of the present invention consists of a chemical composition of $SrAl_2O_4$.

There are cases in which binders include the balance other than $SrAl_2O_4$. For example, in a case in which firing is performed in a state in which the raw material of $SrAl_2O_4$ is not uniformly mixed, there are parts in which the chemical components of SrO and $Al_2O_3$ do not have the same mole amount. In such a case, there are cases in which $SrAl_4O_7$, $Sr_3Al_2O_6$, or the like are generated. With regard to such a case, it is possible to suppress the generation of $SrAl_4O_7$, $Sr_3Al_2O_6$, or the like by sufficiently mixing the raw materials.

In addition, basically, in the present invention the binder does not include strontium aluminate excluding $SrAl_2O_4$, such as $SrAl_4O_7$, $SrAl_{12}O_{19}$, or the like. However, there are cases in which strontium aluminate excluding $SrAl_2O_4$ is inevitably generated during the manufacture. However, since the amount of strontium aluminate having chemical composition different from $SrAl_2O_4$, such as $SrAl_4O_7$, $SrAl_{12}O_{19}$, or the like, which is inevitably generated during the manufacture, is generally as small as 1 mass % or less, which does not influence the effect of the present invention, such cases are considered as being within the scope of the present invention.

Additionally, even in a case in which raw materials are uniformly mixed so as to manufacture a binder, there are cases in which the binders according to the present invention include an inevitable balance free of $SrAl_2O_4$. The composition of such a balance is typically $Al_2O_3$, and also includes examples of $SiO_2$, $TiO_2$, $Fe_2O_3$, MgO, SrO, or the like. With regard to how they can intrude into the binders of the present invention, a case in which they have already been included in raw materials to be used or a case in which the binders are contaminated from a crushing apparatus, a transportation apparatus, a firing apparatus, or the like of binder raw materials or products during the manufacturing process can be considered.

By performing the maintenance and optimization of the application and manufacturing processes of industrially used raw materials, the amount of the impurities can be reduced to a level with no influence on the effects of the present invention. The amount is desirably 5 mass % or less with respect to the total mass of the binders of the present invention in the total amount of chemical components, which is the converted amount of the oxides of the respective chemical components. If the amount is larger than 5 mass %, there are cases in which performance degradation, such as degradation of the strength developing property and corrosion resistance of monolithic refractories using the binders, occurs.

As another embodiment of the binder for monolithic refractories according to the present invention, an embodiment including $Al_2O_3$ mixed to $SrAl_2O_4$ (that is, a binder including a mixture of both $SrAl_2O_4$ and $Al_2O_3$) may be used in a case in which there is a demand for a further increase in the strength or refractoriness of hardened bodies when $SrAl_2O_4$ reacts with water so as to form the hardened body. The preferable amount of $SrAl_2O_4$ in the binder is from 10 mass % to 60 mass %, and the preferable amount of $Al_2O_3$ added is from 40 mass % to 90 mass %. It is desirable that the binder including a mixture of $SrAl_2O_4$ and $Al_2O_3$ have the uniform concentration distribution regarding to both $SrAl_2O_4$ and $Al_2O_3$ by sufficient mixing.

With the amount of $SrAl_2O_4$ of less than 10 mass %, depending on the chemical components or particle size distribution of the aggregates in monolithic refractories, there are cases in which it becomes difficult to develop a sufficient hardened strength. On the other hand, if the amount of $SrAl_2O_4$ is more than 60 mass %, since the amount of $Al_2O_3$ added is relatively decreased, there are cases in which it is not possible to sufficiently increase the strength or refractoriness of hardened bodies.

In general, the amount of binders in monolithic refractories used for pouring construction was from about 10 mass % to 30 mass % in the past, but, in recent years, is reduced to 10 mass % or less.

Even when the amount of $SrAl_2O_4$ in binders is less than 10 mass %, if the amount of Sr in monolithic refractories is made to be large by increasing the amount of the binder, the binder surely serves as a binder and it is possible to obtain monolithic refractories. However, the range of the particle size distribution of refractory aggregates is much larger than that of binders, and therefore the uniformity of a mixture of refractory aggregates and binders is often worse than that of a mixture of binders ($SrAl_2O_4$ and $Al_2O_3$). By uniformly mixing hydraulic components, such as $CaAl_2O_4$ in the conventional technique or $SrAl_2O_4$ in the present invention, and alumina $Al_2O_3$ in advance, the hydraulic components can be uniformly dispersed when manufacturing monolithic refractories by mixing with refractory aggregates, or the like. As a result, the distribution in hydration products during hardening or the distribution of $CaAl_2O_4$, $CaAl_4O_7$, $SrAl_4O_7$ or the solid solutions thereof, which are generated after heating and firing, becomes uniform, and thus it becomes possible to achieve the quality stabilization of monolithic refractories. Therefore, even in the present invention, it is preferable to mix $Al_2O_3$ with $SrAl_2O_4$ in advance.

In addition, if the amount of $Al_2O_3$ to be mixed is 40 mass % or higher, the strength or refractoriness of hardened bodies increases sufficiently, which is preferable. However, if the amount of $Al_2O_3$ to be mixed is more than 90 mass %, the amount of $SrAl_2O_4$ becomes relatively small, and thus it may become difficult to be uniformly hardened. Therefore, the amount of $Al_2O_3$ to be mixed is preferably 90 mass % or less. Further, the above fact is applied to the case in which inevitable balance is present, similarly to the case in which binders consist of $SrAl_2O_4$.

In the binder for monolithic refractories according to the present invention, if the elution rate of Sr ions, which are bivalent positive ions when the binder is mixed with water, becomes excessively large, agglomeration of the binder or refractory aggregates becomes easier, and therefore the operability of monolithic refractories may become degraded. Therefore, depending on the amount of aggregates mixed in the monolithic refractories and the amount of water added, there are cases in which the necessary operation time for construction cannot be secured. In order to solve the above problem, it is preferable in the binder for monolithic refractories according to the present invention to add a dispersant or a hardening retardant.

By preventing agglomeration of the particles of binders or refractory aggregates with the addition of a dispersant and also by suppressing dissolution of the binder in water or sequestering eluted ions using a hardening retardant, it is possible to improve the degradation of the operability of monolithic refractories.

It is preferable to uniformly mix a dispersant and a hardening retardant in the binder before putting into use. This is because, by uniformly mixing the chemical components of the binder and the additives in advance, it is possible to further uniformly disperse the binder components, the additives, and aggregates when manufacturing monolithic refractories by mixing with refractory aggregates, or the like, and therefore the quality stabilization can be achieved. In addition, it is also possible to add and mix a dispersant and a hardening retardant with the binder, refractory aggregates, or the like when manufacturing monolithic refractories, instead of adding a dispersant and a hardening retardant to the binder, and any of the above-described methods can be used.

As a dispersant usable for the present invention, common commercial dispersants for cement (water reducing agents) can be used. That is, it is possible to use at least one selected from a phosphate-based dispersant, an oxycarbonate-based dispersant, a polycarbonate-based dispersant, a melamine-based dispersant, a naphthalene-based dispersant, and a lignin-based dispersant.

The oxycarboxylic acids according to the present invention refer to oxycarboxylic acid or salts thereof. In detail, examples of the oxycarboxylic acids include oxycarboxylic acids, such as citric acid, tartaric acid, succinic acid, lactic acid, gluconic acid, and the like, and salts thereof, but, among them, citric acid and/or alkali metal salts thereof are preferable, and, among the above, the use of sodium citrate is more preferable. The particle size of the oxycarboxylic acids is preferably fine so that the oxycarboxylic acids can be easily dissolved in water when mixed with cement, and the particle size is preferably 100 mesh or less and particularly preferably 200 mesh or less.

Examples of the polycarbonate-based dispersant according to the present invention include polyitaconic acids, polyacrylic acids, polymethacrylic acids, acrylate (methacrylate)-based and maleate-based copolymers, polymers thereof with the graft chains of ethylene oxide added, or the like.

As the melamine-based dispersant, it is possible to use a dispersant including sulfonated melamine condensates with high condensation degree or modified methylol melamine condensates as the major chemical component.

As the naphthalene-based dispersant, it is possible to use a dispersant including (poly)alkylarylsulfonic acid or salts thereof or aryl naphthalene sulfonic acid or salts thereof as the major chemical component.

Examples of the lignin-based dispersant include lignin sulfonic acid or sodium salts thereof, potassium salts thereof, calcium salts thereof and the like, and the use of sodium salts is preferable from the viewpoint of easy availability.

Among the above, since polycarbonate-based dispersants have high dispersion performance and thus can secure the operability of monolithic refractories with a smaller amount added compared to other kinds of dispersants, the use of polycarbonate-based dispersants is particularly preferable.

In addition, in the present invention, it is preferable to use a hardening retardant from the standpoint of an effect of expanding the usable life of monolithic refractories. Hardening retardants commonly used for aluminum cement can be used as the hardening retardant used for the present invention, and, in detail, it is preferable to use at least one selected from a group consisting of boric acid groups, silicofluoride, and sugar.

Examples of boric acid groups include sodium salts, potassium salts, calcium salts, and the like as boric acid and alkali salts thereof, and, among them, the use of boric acid having a strong curing retardation behavior is preferable. The particle size of the boric acid groups is preferably fine so that the boric acid groups can be easily dissolved when kneaded with monolithic refractories for pouring. In addition, the purity of the boric acid groups is not particularly limited, but, currently, industrially purified acids can be used. The particle size of the boric acid groups is preferably fine so that the boric acid groups can be easily dissolved in water when mixed with alumina cement, and the particle size is preferably 100 mesh or less and more preferably 200 mesh or less.

As the silicofluoride, the use of sodium silicofluoride, potassium silicofluoride, magnesium silicofluoride, or the like is preferable, and, among the above, the use of sodium silicofluoride is particularly preferable due to the strong curing retardation behavior. The particle size of the silicofluoride is preferably fine so that the silicofluoride can be easily dissolved in water when mixed with alumina cement, and the particle size is preferably 100 mesh or less and more preferably 200 mesh or less. The purity of the silicofluoride is not particularly limited, but, currently, industrially purified silicofluoride can be used, and it is preferable to use silicofluoride, the purity of which is about 80 mass % or more.

The sugar refers to the aldehydes and ketones of polyhydric alcohols, acids, or polyhydric alcohols, and derivatives or substitutes thereof, and specific examples thereof include glucose, fructose, dextrine, sucrose, or the like.

As the dispersant and the hardening retardant of the present invention, either a powder or a liquid can be used, and, in the case of using a powder dispersant, it is possible to mix it with the binder in advance. In the case of using a liquid dispersant, it is possible to add the agent when mixing monolithic refractories using the binder of the present invention with water. In any of these cases, it is possible to develop the effects of the present invention.

Since the combination of the types of dispersants and/or retardants can be arbitrarily selected depending on the conditions, such as the chemical components or number of the binders, the types or properties of refractory aggregates, temperature in which the agents are used, or the like, the combination is not particularly limited, and it is possible to change the combination according to the mixing ratio of materials. With regard to the amount of the dispersant and the hardening retardant used, it is preferable to add from 0.2 parts by mass to 10 parts by mass with respect to 100 parts by mass of the binder from the standpoint of obtaining favorable operability of monolithic refractories. Here, if the dispersant and the hardening adjuster are liquid, the amount added is specified by the amount of effective components which excludes solvent, or the like.

In general, the usable life or hardening time of monolithic refractories is easily influenced by the maintenance temperature and storage time of materials, the type or rotation speed of a mixer, water temperature, water quality, atmospheric temperature, or the like, and add-in materials are mixed to keep a proper operation time and hardening time within a certain range. The additives play a role for improvement of diverse characteristics, such as improvement in the flow property or water reducing property as well as the usable life or the hardening time. In a case in which the majority of dispersants, hardening retardants and hardening accelerators are used alone, the balance among characteristics, such as the flow property, the usable life, the hardening time, or the like is difficult to maintain and therefore it is not unusual to concurrently use two or more kinds of additives in actual construction.

In a case in which the binder for monolithic refractories of the present invention is used to manufacture actual monolithic refractories, the mixing ratio of the binder and refractory aggregates is not particularly specified, and it has been confirmed that, even with an arbitrary mixing ratio, the effects of the present invention can be obtained.

However, in a case in which the binder for monolithic refractories of the present invention is used to manufacture actual monolithic refractories, with regard to the mixing ratio of the binder and refractory aggregates, it is suggested that the amount of the binder is preferably from 0.2 parts by mass to 20 parts by mass, and further preferably from 0.5 parts by mass to 12 parts by mass with respect to 100 parts by mass of the total amount of the binder and refractory aggregates. In addition, the optimal amount of the binder added is varied depending on the amount of $SrAl_2O_4$ in the binder.

It is because, with an amount of less than 0.2 parts by mass, there are cases in which binding is not sufficient and therefore the strength is not sufficient even after the binder has been hardened. In addition, it is because, with an amount of more than 20 parts by mass, there are cases in which volume change, or the like generated during the hydration or dehydration process of the binder adversely affects the entire monolithic refractories, and therefore cracking, or the like occurs.

As the refractory aggregates of monolithic refractories, fused alumina, fused bauxite, sintered alumina, calcined alumina, fused mullite, synthesized mullite, melted silica, fused zirconia, fused zirconia mullite, zircon, magnesia clinker, fused magnesia, fused magnesite-chrome, sintered spinel, fused spinel, silicone nitride, silicone carbide, squamation graphite, earthy graphite, sillimanite, kyanite, andalusite, agalmatolite, shale, dolomite clinker, silica rock, clay, chamotte, lime, chrome, melted quartz, calcium aluminate, calcium silicate, or silica flower can be used. They may be used alone or in combination of two or more kinds thereof.

In a case in which the binder of the present invention is used as a binder for monolithic refractories, the amount of water or water-containing solvent used for construction is not particularly specified. However, the amount is dependent on the particle size distribution of aggregates or the type and amount of dispersants, and therefore it is preferable that the amount is roughly from about 2 mass % to 10 mass % with respect to the refractory aggregates in outer percentage.

It is because, if the amount is less than 2 mass %, it becomes difficult to harden the binder. In addition, it is because, if the amount is more than 10 mass %, the amount relating to the formation of hardened structures becomes relatively large, and volume change, or the like during hardening reactions becomes liable to adversely affect the quality of refractories.

In addition, if the binder of the present invention is used as a binder for monolithic refractories, in order to appropriately control the rate of the hydration and hardening reactions according to the atmospheric temperature or humidity, it is preferable to add a dispersant or a hardening adjuster when adding the binder to monolithic refractories or adding water to the binder and then performing kneading.

As the dispersant, carbonates, such as sodium carbonate, sodium hydrogen carbonate, or the like; oxycarboxylic acids, such as citric acid, sodium citrate, tartaric acid, sodium tartrate, or the like; polyacrylic acid or methacrylic acid and salts thereof; phosphates, such as sodium tripolyphosphate or sodium hexamethalate, or the like, and/or alkali metals thereof; alkaline-earth metal salts, or the like are mainly used.

Furthermore, since the monolithic refractories of the present invention are used to manufacture dense hardened bodies, during kneading with water, it is possible to use chemical admixtures, such as a water reducing agent, such as a polycarbonate-based water reducing agent, a lignin-based water reducing agent, or the like, a high performance water reducing agent, a high performance AE water reducing agent, or the like. The type and amount added of the above chemical admixtures can be properly selected according to the type or amount of refractory aggregates to be mixed and conditions, such as the construction temperature, or the like.

As the hardening adjuster, a hardening retardant or a hardening accelerator can be used. As the hardening retardant, it is possible to use boric acid, borax, silicofluorides, or the like. On the other hand, as the hardening accelerator, it is possible to use lithium salts, such as lithium citrate, lithium carbonate, or the like; hydroxides, such as slaked lime, or the like; and aluminates, such as sodium aluminate, or the like.

In addition, a method also can be used that increases the ventilation rate of materials by adding an explosion preventer, such as an organic fiber, such as vinylon, or the like, metallic aluminum powder, aluminum lactate, or the like.

Furthermore, it is also possible to add ultrafine powder in order to achieve improvement in the flow property, filling property or sinterability. Examples of the ultrafine powder include inorganic fine powder with a particle diameter of from about 0.01 μm to 100 μm, such as silica fume, colloidal silica, well-sinterable alumina, amorphous silica, zirconia, silicon carbide, silicon nitride, chrome oxide, titanium oxide, or the like.

In a case in which a basic aggregate, such as magnesia, or the like, is mixed, there is a possibility of the generation of cracking caused by hydration swelling of magnesia. In order to suppress such a phenomenon, it is preferable to add a highly surface-active additive, such as fumed silica.

Examples of the manufacturing method of $SrAl_2O_4$, which is a hydraulic material for the binder for monolithic refractories according to the present invention, include a method that uses purified alumina ($\alpha\text{-}Al_2O_3$, $Al(OH)_3$) or bauxite (a raw material of $Al_2O_3$), strontianite ($SrCO_3$) or celestite ($SrSO_4$) as raw materials; mixes the raw materials so as to make the mole ratio of a binder with the aimed composition of $SrAl_2O_4$; and performs melting or firing at a high temperature of 1200° C. or higher or, preferably, 1400° C. or higher with an electric furnace, a reverberating furnace, an open-hearth furnace, a shaft furnace, a shaft kiln, or a rotary kiln.

The temperature in the furnace or melting and firing time is varied depending on the specification of a furnace, such as the volume, heating capacity, or the like, and, in actual cases, it is important to check phases generated in specimens after melting and firing through X-ray diffraction measurement and check whether or not the aimed binder has been generated.

Figure 6:
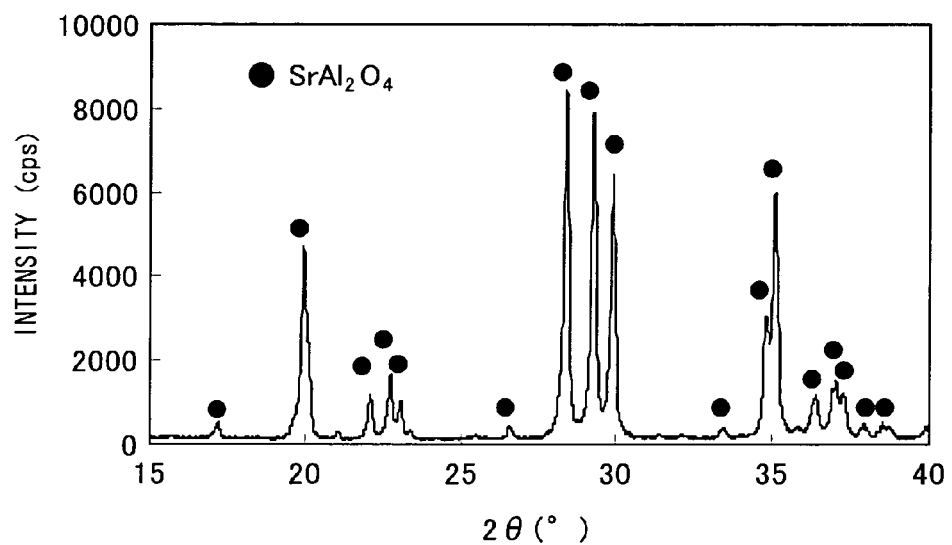
FIG. 6 is a graph showing an example of the measurement result of the X-ray diffraction of $SrAl_2O_4$.

Here, an example of the X-ray diffraction measurement results of $SrAl_2O_4$ is shown in FIG. 6.

In the binder for monolithic refractories according to the present invention, when synthesizing $SrAl_2O_4$, there are cases in which $Sr_3Al_2O_6$ is inevitably generated. If the amount of $Sr_3Al_2O_6$ exceeds 3 parts by mass with respect to $SrAl_2O_4$, there are cases in which the hardening time is shortened, and therefore it becomes difficult to secure a sufficient amount of operation time. Therefore, the amount is preferably 3 parts by mass or less.

In order to suppress the generation of $Sr_3Al_2O_6$, it is preferable to perform adjustment so that the mole ratio of $SrO/Al_2O_3$ in the raw material becomes 1.05 or less (the mass ratio of $SrCO_3/Al_2O_3$ is made to be 1.55 or less), to finely crush the raw material to increase reactivity during firing, and to uniformly mix the raw material as much as possible so as to make the raw material nonbiased. In addition, in order to obtain the chemical composition of $SrAl_2O_4$, the mole ratio of $SrO/Al_2O_3$ in the raw material is preferably 0.95 or higher and more preferably 0.98 or higher. In a case in which the mole ratio of $SrO/Al_2O_3$ is smaller than 0.95, the hydraulic material gets to include $SrAl_4O_7$ and/or $SrAl_{12}O_{19}$ other than $SrAl_2O_4$ after firing, and therefore there are concerns in that degradation in the strength developing property occurs.

Before melting or firing, it is preferable to crush the raw material with a crusher so as to have a 50% average diameter (median diameter) of from about 0.5 μm to 100 μm. It is because, if the raw material includes particles coarser than the above, a large number of compounds having chemical composition other than the aimed $SrAl_2O_4$, such as $SrAl_4O_7$, $SrAl_{12}O_{19}$, and the like as well as unreacted parts and $Sr_3Al_2O_6$, remain, and therefore there are cases in which the intrinsic effects of the present invention become difficult to develop.

In the binder for monolithic refractories according to the present invention, it is possible to add ultrafine powder in order to achieve improvement in the flow property, filling property, or sinterability. Examples of the ultrafine powder include inorganic fine powder with a particle diameter of from about 0.01 μm to 100 μm, such as silica fume, colloidal silica, well-sinterable alumina, amorphous silica, zirconia, silicon carbide, silicon nitride, chrome oxide, titanium oxide, or the like.

Furthermore, in the case of using the binder of the present invention, it is possible to improve a strength developing property by increasing the amount of ultrafine powder of, particularly, 1 μm or less. It is considered because a large amount of Sr ions eluted from the binder are adhered to interfaces with aggregates and agglomerated so as to develop strength. A smaller particle size and larger surface area of the material constituting monolithic refractories further improves the strength developing property. However, an excessive increase of the amount of ultrafine powder leads to degradation in the flow property of monolithic refractories and makes it difficult to obtain uniformly constructed products, and also causes a huge volume change when drying and firing refractories, and therefore there is a concern in that fine cracking occurs and thus the durability thereof deteriorates.

In monolithic refractories using the binder of the present invention, the amount of ultrafine powder of 1 μm or less added is preferably from 2 mass % to 70 mass %, and more preferably from 5 mass % to 50 mass %. If the amount of ultrafine powder of 1 μm or less added is less than 2 mass %, there is a concern of degradation in cured strength. On the other hand, if the amount is larger than 70 mass %, the flow property is degraded after kneading with water and also the shrink becomes large after drying and sintering monolithic refractories. As a result, there is a concern in that internal stress is generated and thus fine cracking occurs, and therefore the durability of monolithic refractories is degraded. Meanwhile, the particle diameter in the present invention refers to the volume average of secondary particles, and the method, principle, or the like for particle diameter measurement is based on things shown in examples to be described below (the measurement results using a particle size analyzer that is used in a laser diffraction method, a laser scattering method, a sedimentation balance method, or the like, which indicates the 50% average diameter).

The raw material can be uniformly mixed using a mixer, such as an Eirich mixer, a rotary drum, a cone blender, a V-shape blender, an omni mixer, a nauta mixer, a pan-type mixer, or the like.

In addition, it is preferable to perform cooling by bringing into contact with high pressure air or water after melting or firing, thereby producing a binder (a hydraulic material) with a uniform structure.

Furthermore, the raw material to be used is preferably a high purity material with 98 mass % or more of a total amount of $Al_2O_3$ and SrO in the raw material. Impurities included in bauxite, strontianite or celestite, such as $SiO_2$, $TiO_2$, MgO, $Fe_2O_3$, or the like, have a possibility of degrading high temperature properties, and it is preferable to suppress these to an extremely small amount.

The amount of a binder in a monolithic refractory can be obtained by quantifying the amount of $SrAl_2O_4$ and $\alpha$-alumina in the monolithic refractory using a quantitative method of the mineral composition through the X-ray diffraction Rietveld method. (However, in a case in which alumina is mixed with refractory aggregates in the monolithic refractory, it is impossible to quantify $\alpha$-alumina included in the binder.)

In order to secure the operability of the monolithic refractory of the present invention and to obtain the time for securing the operability, hardening rate, and the strength of hardened bodies in a proper range, the crystallite diameter of $SrAl_2O_4$ is preferably in a range of from 40 nm to 80 nm. If the crystallite diameter of $SrAl_2O_4$ is less than 40 nm, the hardening time is shortened and therefore it becomes difficult to secure a sufficient operation time particularly when there is a large amount to be constructed, and the flow property is degraded as a part of the material is hardened during a time period from kneading to construction and therefore there is a possibility of degradation in constructability and the quality degradation of constructed bodies. In addition, if the crystallite diameter exceeds 80 nm, the strength development of constructed bodies is delayed after curing the constructed bodies, and also there is a possibility in that the cured strength is lowered even after the same curing time. In this case, degradation in the productivity or the cured strength due to the extension of curing time leads to the quality degradation of constructed bodies, such as degradation of explosion resistance during drying, or the like.

Here, the crystallite refers to "the size of a minute crystal present as a perfect single crystal in a polycrystalline body" as defined in JIS H7008. In addition, in the present invention, as the crystallite diameter of $SrAl_2O_4$, the value calculated by the Scherrer method after obtaining the full-width at half maximum from the diffraction peak of (−2 1 1) plane with $2\theta$ of about 28.4° obtained by the powder X-ray diffractometry is used.

In detail, samples are taken from various places, such as the surface, interior, or the like of a fired body, in $SrAl_2O_4$, for which a variety of raw materials are prepared and synthesized by a firing method, to obtain average evaluation samples, and then the samples are collected, divided, and then crushed by a crusher so that the center particle diameter becomes 10 μm or less. The samples is measured using A powder X-ray diffractometer (for example, JDX-3500, trade name, manufactured by JEOL Ltd.), and it is possible to calculate the crystallite diameter using JADE 6, a powder X-ray diffraction pattern analyzing software.

The measurement of crystallite diameters using an X-ray diffractometer may be performed under the conditions of an X-ray source of CuKα, a tube voltage of 40 kV, a tube current of 300 mA, a step angle of 0.02°, and a spectroscopy with a measurement condition of monochromator of $2\theta$ from 15° to 40°. With regard to the X-ray diffractometer-derived full-width at half maximum used for the analysis of crystallite diameter, it is possible to use values obtained by measuring silicon powder specimens with the same diffractometer under the same conditions and then obtaining the full-width at half maximum curves.

Meanwhile, the measurement of the crystallite diameter of $SrAl_2O_4$ in the examples to be described below was performed by the above-described method.

In a case in which the crystallite diameter of the above $SrAl_2O_4$ is made to be from 40 nm to 80 nm, the temperature at which the molded bodies of the raw materials are fired using a firing apparatus, such as an electric furnace, a shuttle kiln, a rotary kiln, or the like, is preferably from 1200° C. to 1600° C. and more preferable from 1400° C. to 1500° C. If the firing temperature is lower than 1200° C., unreacted raw materials are liable to remain and there are cases in which the synthesis of $SrAl_2O_4$ is not possible. In addition, if the firing temperature is higher than 1600° C., there are cases in which the crystallite diameter of $SrAl_2O_4$ becomes large, and thus the reactivity is degraded when $SrAl_2O_4$ is mixed with water, and therefore the strength developing property deteriorates. At a temperature of from 1400° C. to 1500° C., it is possible to shorten the firing time to obtain a predetermined crystallite diameter and also to achieve the improvement of the productivity and the prevention of a trouble of degradation in strength developing property due to excessive firing during the manufacture since it becomes difficult for the crystallite diameter to be excessively increased due to excessive firing. The time period of firing may be adjusted so that an aimed crystallite diameter is obtained at each temperature, and, for example, is from about 0.7 hours to 60 hours at 1400° C. and from about 0.5 hours to 48 hours at 1500° C.

When the crystallite diameter of $SrAl_2O_4$ is set in the above range, it is possible to manufacture $SrAl_2O_4$ under the following conditions. However, since the crystallite diameter varies with the particle size of raw materials, the amount of water during the manufacture of molded bodies of raw materials, the size of molded bodies, or the like, there are also cases in which it is not possible to manufacture $SrAl_2O_4$ under the following conditions.

When $SrAl_2O_4$ with a crystallite diameter of smaller than 40 nm is manufactured, it is possible to fire at a temperature of from about 1100° C. to 1300° C. for from about 0.5 hours to 10 hours. If the temperature is lower than 1100° C. or the firing time is extremely short, the reaction does not proceed and therefore unreacted raw materials are liable to remain. In addition, when $SrAl_2O_4$ with a crystallite diameter of larger than 80 nm is manufactured, it is possible to manufacture $SrAl_2O_4$ by firing at a temperature of 1600° C. or higher for 12 hours or more.

Since the particle size of binders (hydraulic materials) affects hydration reaction or hardening rate, it is preferable to control particles to from about 1 μm to 20 μm by a crusher after melting or firing. The particle size is a measurement result by a particle size analyzer used for a laser diffractometry, a laser scattering method, a sedimentation balance method, or the like and indicates the 50% average diameter.

As the crusher, it is possible to use an industrial crusher, such as an oscillating mill, a tube mill, a ball mill, a roller mill, or the like.

In addition, another embodiment of the binder according to the present invention can be manufactured by mixing α-alumina powder to $SrAl_2O_4$ obtained by the above-described method.

α-alumina powder refers to high purity alumina including 90 mass % or more of $Al_2O_3$, and generally alumina is manufactured by the Bayer process. In this method, firstly, bauxite is washed in a hot solution of sodium hydroxide (NaOH) at 250° C. In this process, alumina is transformed to aluminum hydroxide ($Al(OH_3)$) and dissolved by a reaction shown in the following formula (1).

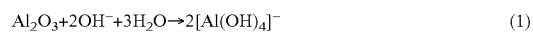

$$Al_2O_3 + 2OH^- + 3H_2O \rightarrow 2[Al(OH)_4]^- \quad (1)$$

At this time, other chemical components in the bauxite are not dissolved and can be removed through filtering as solid impurities. Subsequently, if the solution is cooled, the dissolved aluminum hydroxide is precipitated as a white fluffy solid. If the solid is subjected to a firing treatment at 1050° C. or higher using a rotary kiln, or the like, dehydration shown in the following formula (2) occurs and therefore alumina is generated.

$$2Al(OH)_3 \rightarrow Al_2O_3 + 3H_2O \quad (2)$$

Since binders are highly dependent on the specific surface area of α-$Al_2O_3$ mixed in hydraulic materials in terms of the flow property, the BET specific surface area of α-$Al_2O_3$ is preferably from about 0.1 m²/g to 30 m²/g.

It is possible to use the α-$Al_2O_3$ either by mixing with hydraulic materials in a predetermined ratio and crushing the mixture with a crusher or by crushing the α-$Al_2O_3$ alone to a particle size of binders and then mixing hydraulic materials which have been crushed in the same manner. When the α-$Al_2O_3$ is crushed alone, it is preferable to crush the α-$Al_2O_3$ so as to have a center particle diameter of from about 1 μm to 10 μm. In the present invention, the manner in which α-$Al_2O_3$ is mixed first with hydraulic materials and then crushed is preferable since α-$Al_2O_3$ is uniformly mixed in the binder composition and therefore the microstructure of the hardening bodies is liable to become uniform when used for monolithic refractories, and this manner has a tendency of improving performance, such as corrosion resistance, or the like.

EXAMPLES

Hereinafter, the present invention will be described in detail with examples, but the present invention is not limited to the examples.

As the raw materials of hydraulic materials, $SrCO_3$ with a purity of 98 mass % (manufactured by Sakai Chemical Industry Co., Ltd.) and high purity α-alumina with a purity of 99 mass % (manufactured by Nippon Light Metal Co., Ltd.) were used. In addition, in order to compare a comparative example with examples in which alumina cement in the conventional technique, including Ca, is used, $CaCO_3$ with a purity of 99 mass % (manufactured by Ube Material Co., Ltd.) was also used as the comparative example.

In addition, in order to study the effects of inevitable impurities, a variety of reagents with a purity of 99.5 mass %, such as silicon oxide, titanium oxide, magnesium oxide and ferric oxide were used.

Each of the raw materials was weighed with a scale so as to have the chemical compositions in the following Tables 1 to 11, and then mixed and crushed with mortar. 15 mass % of water was added to the mixed and crushed raw materials in outer percentage, and the obtained mixture was granulated into spherical pellets with a diameter of about 20 mm, and then about 2 kg of the particles were fed into an alumina container and then subjected to a heating treatment at 1400° C. for 48 hours in the air atmosphere using an electric furnace (with a furnace volume of 130 L). After that, the pellets were cooled to room temperature and placed in the air, and then crushed with a batch type ball mill so as to obtain hydraulic materials shown in the examples.

Hydraulic materials manufactured by the above method in which two kinds of raw materials of $SrCO_3$ and α-alumina are used and adjustment is performed so as to obtain the equal mole ratio of SrO and $Al_2O_3$ components will hereinafter be called $SrAl_2O_4$ since they are slightly influenced by inevitable impurities and can obtain the composition of $SrAl_2O_4$. In addition, hydraulic materials manufactured by using two kinds of raw materials of $CaCO_3$ and α-alumina are used and performing adjustment so as to obtain the equal mole ratio of CaO and $Al_2O_3$ components also will be called, likewise, $CaAl_2O_4$.

Furthermore, with regard to examples in which $Al_2O_3$ is mixed, high purity α-alumina (manufactured by Nippon Light Metal Co., Ltd.) was added to the obtained hydraulic materials so as to obtain a predetermined chemical component and then mixed and crushed using a batch type ball mill, thereby manufacturing binders. In addition, even when manufacturing binders in which a dispersant, a hardening retardant, $SrAl_4O_7$, $SrAl_{12}O_{19}$, and $SrAl_{12}O_{19}$ as chemical compositions are mixed in addition to hydraulic materials and α-$Al_2O_3$, a variety of materials were mixed so as to obtain a predetermined chemical component and then mixed and crushed using a batch type ball mill, thereby manufacturing binders.

8 parts by mass of the binder and 92 parts by mass of refractory aggregates (50 mass % of sintered alumina with a particle size by sieving of 1 μm or lower, 43 mass % of fused alumina with a particle size of from 75 μm to 5 mm, 6 mass % of magnesia, 0.8 mass % of silica flower, and 0.15 mass % of vinylon fiber) were mixed for 1 minute with an omni mixer, and, furthermore, 6.8 parts by mass of water was added to 100 parts by mass of the mixture thereof in a constant temperature room of 20° C. and then mixed and kneaded with a mortar mixer for 3 minutes, thereby obtaining monolithic refractory specimens.

The flexural strength after curing was measured according to JIS 82553 after the monolithic refractory specimens were poured into a 40×40×160 mm mold form and then cured in a constant temperature room at 20° C. for a predetermined time. In addition, the curing time was set to 6, 12, 24, and 48 hours after the start of mixing, at which water was added to monolithic refractories.

Figure 7:
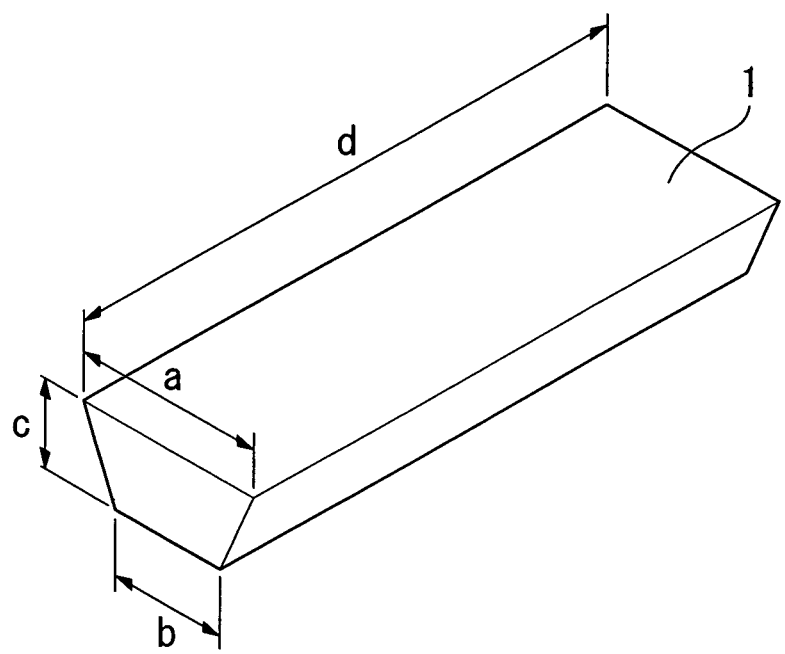
FIG. 7 is a perspective view showing the shape of refractory 1 which is an evaluation specimen used in examples.
Figure 8:
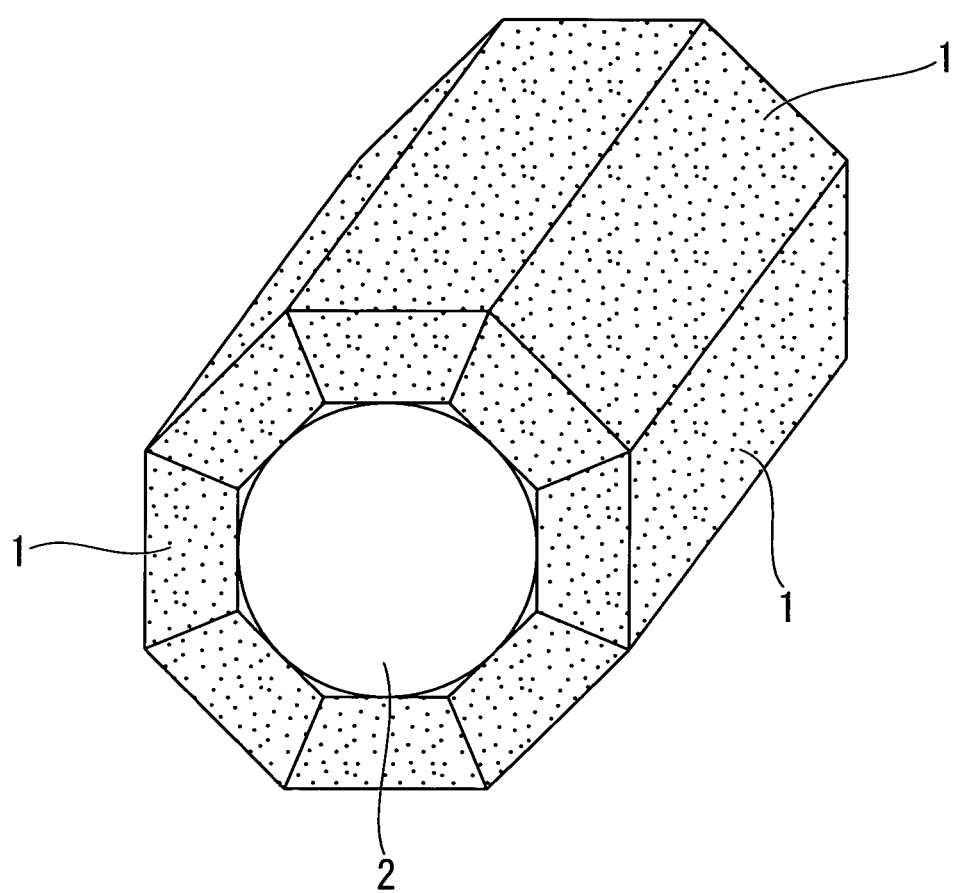
FIG. 8 is a perspective view showing the external appearance of the test body which is produced by combining the test specimen (the refractory 1) used in the examples.

The rotary corrosion method was used for the evaluation of corrosion resistance with respect to slag at a high temperature. Specimens (refractory 1) cut out into the shape as in FIG. 7 were manufactured, and, as shown in FIG. 8, 8 pieces of the refractory 1 were lined and embedded in a rotary furnace. The size of the refractory 1 shown in FIG. 7 was a=67 mm, b=41 mm, c=48 mm, and d=114 mm. In addition, a cylindrical protection plate 2 (with a diameter of about 150 mmφ) was embedded on the inner side on which 8 pieces of the refractory 1 were lined.

Figure 9:
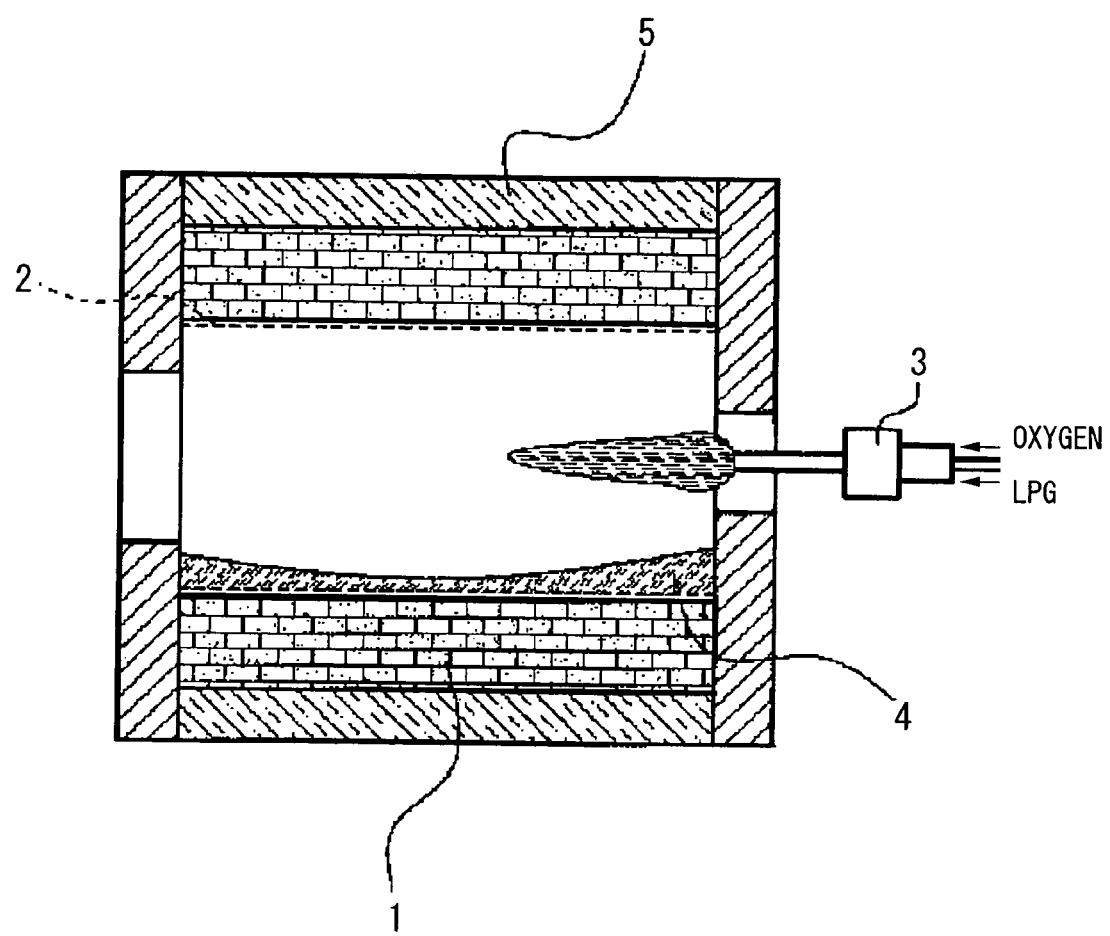
FIG. 9 is a cross-sectional view of the rotary corrosion furnace used in the examples.

As shown in FIG. 9, the embedded refractory 1 was installed in the rotary furnace, and the temperature was increased by the burning of a burner 3 from the inside of the rotary furnace while rotating the refractory 1. As the burning gas, a gas with a volume ratio of 1 LPG to 5 oxygen was used. Further, the reference number 4 indicates slag, and the reference number 5 indicates a filling material.

The wear amount of each specimen was obtained from the average value obtained by measuring the remaining dimensions at 5 points every 20 mm and calculating the difference with the initial thickness (48 mm). The composition of the slag 4 includes 50.5 mass % of CaO, 16.8 mass % of $SiO_2$, 7 mass % of MgO, 2 mass % of $Al_2O_3$, 3.5 mass % of MnO, and 20.2 mass % of FeO, and, with the test temperature of 1600° C. and 1 charge of 25 minutes, 500 g of the slag 4 was subjected to 1 charge of the test for a replacement, and the test was performed for a total of 6 charges for 2 hours 30 minutes. The old charge of the slag 4 was replaced with a new charge of the slag 4 by tilting a horizontal type drum.

[1] Monolithic Refractory Using a Binder Consisted of $SrAl_2O_4$

Measurement of the flexural strength after curing and rotary corrosion tests using slag were performed using a monolithic refractory manufactured using hydraulic materials for which the chemical components of a binder had been controlled to obtain the chemical composition of $SrAl_2O_4$ in Example 1, monolithic refractories using hydraulic materials manufactured by mixing a variety of contamination components in Examples 2 to 10 in order to verify the effects of the contamination amount of the raw materials to be used and inevitable impurities generated during the manufacturing process, monolithic refractories with increased amounts of a variety of contamination components mixed in Comparative Examples 1 to 6, and a monolithic refractory manufactured using hydraulic materials including no Sr as a binder component in Comparative Example 7. Table 1 shows the chemical composition, chemical components, measurement results of flexural strength after curing, and results of the rotary corrosion test of each of the Examples and Comparative Examples.

TABLE 1

|  |  | Examples |  |  |  |  |  |  |  |  |  | Comparative Examples |  |  |  |  |  |  |
|---|---|---|---|---|---|---|---|---|---|---|---|---|---|---|---|---|---|---|
|  |  | 1 | 2 | 3 | 4 | 5 | 6 | 7 | 8 | 9 | 10 | 1 | 2 | 3 | 4 | 5 | 6 | 7 |
| Raw materials for blending | CaCO$_3$ | 0 | 0 | 0 | 0 | 0 | 0 | 0 | 0 | 0 | 0 | 0 | 0 | 0 | 0 | 0 | 0 | 63.4 |
|  | SrCO$_3$ | 72.3 | 71.6 | 71.6 | 71.6 | 71.6 | 68.7 | 68.7 | 68.7 | 68.7 | 69.4 | 65.1 | 65.1 | 65.1 | 65.1 | 66.6 | 63.7 | 0.0 |
|  | α-Al$_2$O$_3$ | 49.5 | 49.0 | 49.0 | 49.0 | 49.0 | 47.0 | 47.0 | 47.0 | 47.0 | 47.5 | 44.6 | 44.6 | 44.6 | 44.6 | 45.6 | 43.6 | 64.7 |
|  | SiO$_2$ | 0 | 1.0 | 0 | 0 | 0 | 5.0 | 0 | 0 | 0 | 1.0 | 10.0 | 0 | 0 | 0 | 2.0 | 3.0 | 0 |
|  | TiO$_2$ | 0 | 0 | 1.0 | 0 | 0 | 0 | 5.0 | 0 | 0 | 1.0 | 0 | 10.0 | 0 | 0 | 2.0 | 3.0 | 0 |
|  | MgO | 0 | 0 | 0 | 1.0 | 0 | 0 | 0 | 5.0 | 0 | 1.0 | 0 | 0 | 10.0 | 0 | 2.0 | 3.0 | 0 |
|  | Fe$_2$O$_3$ | 0 | 0 | 0 | 0 | 1.0 | 0 | 0 | 0 | 5.0 | 1.0 | 0 | 0 | 0 | 10.0 | 2.0 | 3.0 | 0 |
| Chemical components (parts by mass) | SrO | 49.8 | 49.4 | 49.4 | 49.5 | 49.4 | 47.4 | 47.3 | 47.4 | 47.3 | 48 | 44.9 | 44.9 | 45 | 44.9 | 45.8 | 44 | — |
|  | Al$_2$O$_3$* | 49.0 | 48.5 | 48.6 | 48.6 | 48.5 | 46.5 | 46.7 | 46.5 | 46.6 | 47 | 44.2 | 44.2 | 44.1 | 44.3 | 45.3 | 43.3 | 64.0 |
|  | Others | 1.2 | 2.1 | 2 | 1.9 | 2.1 | 6.1 | 6 | 6.1 | 6.1 | 5 | 10.9 | 10.9 | 10.9 | 10.8 | 8.9 | 12.7 | 36 |
| Flexural strength after curing of 6 hours (MPa) |  | 1.6 | 1.5 | 1.5 | 1.6 | 1.6 | 1.2 | 1.1 | 1.2 | 1.3 | 1.3 | 0.8 | 0.7 | 0.7 | 0.9 | 0.9 | 0.6 | 0.7 |
| Flexural strength after curing of 12 hours (MPa) |  | 1.9 | 1.9 | 1.8 | 1.8 | 1.9 | 1.4 | 1.5 | 1.4 | 1.6 | 1.7 | 1.3 | 1.3 | 1.2 | 1.4 | 1.4 | 1.1 | 1.2 |
| Flexural strength after curing of 24 hours (MPa) |  | 2.2 | 2.3 | 2.2 | 2.2 | 2.3 | 1.8 | 1.8 | 1.8 | 2 | 2 | 1.5 | 1.6 | 1.5 | 1.8 | 1.8 | 1.4 | 1.5 |
| Flexural strength after curing of 48 hours (MPa) |  | 2.5 | 2.5 | 2.4 | 2.4 | 2.5 | 2.2 | 2.1 | 2.2 | 2.3 | 2.2 | 1.8 | 1.9 | 1.8 | 2 | 2 | 1.7 | 2.5 |
| Wear amount in the rotary corrosion test/mm |  | 6.4 | 6.5 | 6.6 | 6.4 | 6.6 | 6.9 | 6.9 | 6.6 | 7 | 6.7 | 7.4 | 7.5 | 7.3 | 7.6 | 7.3 | 7.9 | 8.2 |

Note)
*Al$_2$O$_3$ other than SrAl$_2$O$_4$ and CaAl$_2$O$_4$

The evaluation results are as shown in Table 1. In Example 1, since a part of the materials was hardened during kneading, materials were taken from uncured parts and then cured so as to manufacture specimens for the flexural strength measurement and the rotary corrosion test. It has been clarified that, compared to Comparative Example 7 including no Sr, Examples 1 to 10 clearly show small wear amounts in the rotary corrosion test using slag and are excellent in terms of slag resistance at a high temperature.

Furthermore, Examples 1 to 10 show larger values than Comparative Example 7 in the flexural strength after curing of 6, 12, and 24 hours, and therefore it has been clarified that Examples 1 to 10 are excellent in terms of cured strength developing property. In particular, the flexural strength after curing of 6 hours is remarkably greater compared to those of the Comparative Examples, and therefore it has been confirmed that Examples 1 to 10 are excellent in terms of early strength developing property.

In addition, Comparative Examples 1 to 6 show degradation in the cured flexural strength and an increase in the wear amount in the rotary corrosion test using slag since they include from 8.5 mass % to 15.5 mass % of chemical components other than SrO and Al$_2$O$_3$ constituting SrAl$_2$O$_4$, which is a complex oxide, but Examples 2 to 10 show a favorable strength developing property and excellent high temperature slag resistance, which clarifies that favorable characteristics can be obtained by including 5 mass % or less of chemical components other than SrO and Al$_2$O$_3$.

[2] Monolithic Refractory Using a Binder Including Al$_2$O$_3$ mixed in SrAl$_2$O$_4$ Measurement of the flexural strength after curing and rotary corrosion tests using slag were performed using a monolithic refractory manufactured using hydraulic materials having a binder including SrAl$_2$O$_4$ only in Example 1, monolithic refractories using hydraulic materials manufactured using a binder further including a predetermined amount of Al$_2$O$_3$ mixed in Examples 11 to 19, and monolithic refractories manufactured using a binder including no Sr, but a predetermined amount of Al$_2$O$_3$ in Comparative Examples 7 to 10. Table 2 shows the chemical composition, measurement results of flexural strength after curing, and results of the rotary corrosion test of each of the Examples and Comparative Examples.

TABLE 2

|  |  | Examples |  |  |  |  |  |  |  |  |  | Comparative Examples |  |  |  |
|---|---|---|---|---|---|---|---|---|---|---|---|---|---|---|---|
|  |  | 1 | 11 | 12 | 13 | 14 | 15 | 16 | 17 | 18 | 19 | 7 | 8 | 9 | 10 |
| Raw materials for blending | CaCO$_3$ | 0 | 0 | 0 | 0 | 0 | 0 | 0 | 0 | 0 | 0 | 63.4 | 38.1 | 25.4 | 6.3 |
|  | SrCO$_3$ | 72.3 | 57.8 | 44.8 | 43.4 | 36.1 | 28.9 | 21.7 | 14.5 | 7.2 | 5.8 | 0.0 | 0.0 | 0.0 | 0.0 |
|  | α-Al$_2$O$_3$ | 49.5 | 39.6 | 30.7 | 29.7 | 24.7 | 19.8 | 14.8 | 9.9 | 4.9 | 3.9 | 64.7 | 38.8 | 25.9 | 6.5 |
| SrAl$_2$O$_4$ |  | 100 | 80 | 62 | 60 | 50 | 40 | 30 | 20 | 10 | 8 | 0 | 0 | 0 | 0 |
| CaAl$_2$O$_4$ |  | 0 | 0 | 0 | 0 | 0 | 0 | 0 | 0 | 0 | 0 | 100 | 60 | 40 | 10 |
| Al$_2$O$_3$* |  | 0 | 20 | 38 | 40 | 50 | 60 | 70 | 80 | 90 | 92 | 0 | 40 | 60 | 90 |
| Flexural strength after curing of 6 hours (MPa) |  | 1.6 | 1.5 | 1.4 | 1.4 | 1.4 | 1.3 | 1.3 | 1.2 | 1.0 | 1.0 | 0.7 | 0.7 | 0.3 | 0.2 |
| Flexural strength after curing of 12 hours (MPa) |  | 1.9 | 1.8 | 1.6 | 1.7 | 1.6 | 1.5 | 1.5 | 1.4 | 1.3 | 1.2 | 1.2 | 1.1 | 0.8 | 0.7 |
| Flexural strength after curing of 24 hours (MPa) |  | 2.2 | 2.0 | 1.8 | 1.8 | 1.7 | 1.7 | 1.7 | 1.6 | 1.6 | 1.4 | 1.5 | 1.4 | 1.0 | 0.9 |

TABLE 2-continued

|  | Examples | | | | | | | | | | Comparative Examples | | | |
|---|---|---|---|---|---|---|---|---|---|---|---|---|---|---|
|  | 1 | 11 | 12 | 13 | 14 | 15 | 16 | 17 | 18 | 19 | 7 | 8 | 9 | 10 |
| Flexural strength after curing of 48 hours (MPa) | 2.5 | 2.3 | 2.0 | 2.0 | 1.9 | 1.9 | 1.9 | 1.8 | 1.8 | 1.8 | 2.5 | 2.2 | 1.5 | 1.2 |
| Wear amount in the rotary corrosion test/mm | 6.4 | 6.3 | 6.1 | 5.9 | 5.7 | 5.6 | 5.4 | 5.3 | 5.2 | 5.0 | 8.2 | 8.0 | 7.9 | 7.8 |

Note)
*$Al_2O_3$ other than $SrAl_2O_4$ and $CaAl_2O_4$

The evaluation results are as shown in Table 2. In Examples 1 and 11 to 15, since a part of the materials was hardened during kneading, materials were taken from uncured parts and then cured so as to manufacture specimens for the flexural strength measurement and the rotary corrosion test. It has been clarified that, compared to Comparative Examples 1 to 4, Examples 1 and 11 to 19 clearly show small wear amounts in the rotary corrosion test using slag and are excellent in terms of slag resistance at a high temperature.

Furthermore, Examples 1 and 11 to 19 show larger values than Comparative Examples 1 to 4 in the flexural strength after curing of 6, 12, and 24 hours, and therefore it has been clarified that Examples 1 and 11 to 19 are excellent in terms of cured strength developing property. In particular, the flexural strength after curing of 6 hours is remarkably larger compared to those of the Comparative Examples, and therefore it has been confirmed that Examples 1 and 11 to 19 are excellent in terms of early strength developing properties.

In addition, in Examples 11 to 19, it is possible to further decrease the wear amount in the rotary corrosion test using slag, compared to even Example 1, since Examples 11 to 19 include $Al_2O_3$, which clarifies that Examples 11 to 19 are superior in terms of slag resistance at a high temperature.

Among the above, when using a binder including from 10 mass % to 60 mass % of $SrAl_2O_4$ and from 40 mass % to 90 mass % of $Al_2O_3$, it is possible to increase high temperature slag resistance while keeping favorable strength developing property. Furthermore, when using a binder including from 20 mass % to 50 mass % of $SrAl_2O_4$ and from 50 mass % to 80 mass % of $Al_2O_3$, it is possible to obtain better strength and to increase slag resistance.

[3] Monolithic Refractory Using a Binder Including a Dispersant and a Hardening Retardant In the above test methods, a predetermined amount of $SrAl_2O_4$, $\alpha$-$Al_2O_3$, a dispersant and/or a hardening retardant was mixed to the base of a binder including a mixture of 40 parts by mass of $SrAl_2O_4$ and 60 parts by mass of $Al_2O_3$ and then crushed so as to manufacture binders. Monolithic refractories were manufactured with an amount of water added reduced to 6.2 parts by mass with respect to 100 parts by mass of a mixture of the binder and refractory aggregates, and the same test was performed. Table 3 shows the chemical composition, mixing ratio of the dispersant and the hardening retardant, and the hardening retardant, measurement results of flexural strength after curing and results of the rotary corrosion test of each of the Examples and Comparative Examples.

Here, a commercially available powder polycarboxylic acid-based dispersant was used as the dispersant in Table 3, and boric acid (primary reagent) was crushed to 200 mesh or lower and used as the hardening retardant.

TABLE 3

|  | Examples | | | | | | | | | Comparative Examples | | |
|---|---|---|---|---|---|---|---|---|---|---|---|---|
|  | 20 | 21 | 22 | 23 | 24 | 25 | 26 | 27 | 28 | 11 | 12 | 13 |
| $SrAl_2O_4$ | 39.9 | 39.4 | 38.8 | 39.8 | 39.6 | 39.4 | 39.5 | 39.0 | 38.4 | 0.0 | 0.0 | 0.0 |
| $CaAl_2O_4$ | 0.0 | 0.0 | 0.0 | 0.0 | 0.0 | 0.0 | 0.0 | 0.0 | 0.0 | 39.4 | 39.6 | 39.0 |
| $Al_2O_3$* | 59.8 | 59.1 | 58.2 | 59.7 | 59.4 | 59.1 | 59.2 | 58.5 | 57.6 | 59.1 | 59.4 | 58.5 |
| Dispersant (parts by mass) | 0.3 | 1.5 | 3 | — | — | — | 0.3 | 1.5 | 3 | 1.5 | — | 1.5 |
| Hardening retardant (parts by mass) | — | — | — | 0.5 | 1 | 1.5 | 1 | 1 | 1 | — | 1 | 1 |
| Flexural strength after curing of 6 hours (MPa) | 1.7 | 1.6 | 1.6 | 1.6 | 1.5 | 1.3 | 1.6 | 1.5 | 1.4 | 0.5 | 0.4 | 0.3 |
| Flexural strength after curing of 12 hours (MPa) | 2.1 | 2.0 | 1.9 | 1.9 | 1.8 | 1.7 | 1.8 | 1.8 | 1.7 | 1.2 | 1.0 | 0.8 |
| Flexural strength after curing of 24 hours (MPa) | 2.4 | 2.4 | 2.3 | 2.4 | 2.2 | 2.1 | 2.1 | 2.0 | 1.9 | 1.6 | 1.3 | 1.2 |
| Flexural strength after curing of 48 hours (MPa) | 2.6 | 2.5 | 2.4 | 2.5 | 2.3 | 2.2 | 2.3 | 2.1 | 2.1 | 1.9 | 1.8 | 1.7 |
| Wear amount in the rotary corrosion test/mm | 5.2 | 5.2 | 5.3 | 5.2 | 5.3 | 5.4 | 5.2 | 5.3 | 5.4 | 7.6 | 7.7 | 7.6 |

Note)
*$Al_2O_3$ other than $SrAl_2O_4$ and $CaAl_2O_4$

The evaluation results are as shown in Table 3. When using a dispersant and/or a hardening retardant, regardless of the reduced amount of water added to monolithic refractories, hardening of the materials was not observed in any of the Examples during the kneading or the manufacture of test specimens, and it was possible to manufacture test specimens. In addition, since monolithic refractories were manufactured with a reduced amount of water added, an increase in cured flexural strength and a decrease in the wear amount in the rotary corrosion test using slag could be obtained.

For Examples 20 to 28, likewise, a dispersant and/or a hardening retardant were added and the amount of water added was reduced, and, compared with Comparative Examples 11 to 13 including no Sr in the chemical component of the binder, it has been clarified that Examples 20 to 28 show large flexural strength and excellent cured strength developing properties in any of the curing times. In particular, the flexural strength after curing of 6 hours is remarkably larger compared to those of the Comparative Examples, and therefore it has been confirmed that Examples 20 to 28 are excellent in terms of early strength developing properties, clearly show small wear amounts in the rotary corrosion test using slag, and are excellent in terms of slag resistance at a high temperature.

[4] Monolithic Refractory Using a Binder with a Varied Crystallite Diameter of $SrAl_2O_4$ In the above test methods, a heating treatment was performed for a predetermined time with a firing temperature of hydraulic materials varied to from 1050° C. to 1600° C. so as to manufacture $SrAl_2O_4$ with an adjusted crystallite diameter. In addition, a firing temperature was retained at 1300° C. for 5 hours so as to manufacture fired specimens, and comparison with the above-described firing conditions in Japanese Unexamined Patent Application, First Publication No. S58-26079 was performed. The same tests were performed on monolithic refractories manufactured using a binder including a mixture of 40 parts by mass of $SrAl_2O_4$ and 60 parts by mass of $Al_2O_3$. Table 4 shows the mixing ratios and firing conditions.

Even in Comparative Example 17 for which firing was performed at a temperature of 1300° C. retained for 5 hours according to the firing conditions described in Japanese Unexamined Patent Application, First Publication No. S58-26079, likewise, operability was lost during the kneading, and therefore poor pouring occurred during the manufacture of test specimens and cured strength was degraded and the wear amount was increased in the rotary corrosion test.

In addition, Comparative Example 18 showed small flexural strength after curing of 6, 12, and 24 hours, and therefore it was not possible to sufficiently develop cured strength within a short time. As a result, it was not possible to provide specimens for the evaluation of corrosion resistance by the rotary corrosion test.

On the other hand, Examples 29 to 35 can secure operability for the manufacture of test specimens and therefore showed larger flexural strength than Comparative Example 18. In addition, compared to Comparative Example 9 in which the same amount of $CaAl_2O_4$ as that of hydraulic components mixed was mixed, large flexural strength could be obtained even in any case, and therefore it was possible to decrease the wear amount in the rotary corrosion test using slag. Therefore, it is clear that Examples 29 to 35 are excellent in terms of strength developing property and slag resistance at a high temperature. From the above test results, the preferable crystallite diameter of $SrAl_2O_4$ in the present invention is in a range of from 40 nm to 80 nm.

[5] Monolithic Refractory Including a Chemical Component of $SrAl_4O_7$

In addition, with the same method as above, a hydraulic material having a binder including $SrAl_4O_7$ only was obtained, and high purity α-alumina (manufactured by Nippon Light Metal Co., Ltd.) was mixed with the obtained hydraulic material so as to obtain a predetermined chemical component. Table 5 shows the results.

Measurement of the flexural strength after curing and rotary corrosion tests using slag were performed for a monolithic refractory manufactured using hydraulic materials having a binder including $SrAl_4O_7$ only in Comparative Example 21, monolithic refractories manufactured using a binder fur-

TABLE 4

| | Examples | | | | | | | Comparative Examples | | | | |
|---|---|---|---|---|---|---|---|---|---|---|---|---|
| | 29 | 30 | 31 | 32 | 33 | 34 | 35 | 14 | 15 | 16 | 17 | 18 |
| Firing temperture (° C.) | 1200 | 1300 | 1400 | 1400 | 1500 | 1500 | 1600 | 1050 | 1200 | 1300 | 1300 | 1600 |
| Firing time (hr) | 48 | 48 | 1 | 48 | 1 | 48 | 1 | 48 | 1 | 1 | 5 | 48 |
| Crystallite size of $SrAl_2O_4$ (nm) | 39 | 51 | 45 | 68 | 53 | 77 | 81 | 24 | 28 | 31 | 36 | 87 |
| $SrAl_2O_4$ | 40 | 40 | 40 | 40 | 40 | 40 | 40 | 40 | 40 | 40 | 40 | 40 |
| $Al_2O_3$* | 60 | 60 | 60 | 60 | 60 | 60 | 60 | 60 | 60 | 60 | 60 | 60 |
| Flexural strength after curing of 6 hours (MPa) | 1.8 | 1.5 | 1.7 | 1.3 | 1.6 | 1.1 | 0.9 | — | — | — | 0.6 | 0.3 |
| Flexural strength after curing of 12 hours (MPa) | 2.1 | 1.8 | 2.0 | 1.5 | 1.9 | 1.4 | 1.2 | — | — | — | 0.9 | 0.6 |
| Flexural strength after curing of 24 hours (MPa) | 2.2 | 2.0 | 2.1 | 1.7 | 2.1 | 1.7 | 1.5 | — | — | — | 1.0 | 0.8 |
| Flexural strength after curing of 48 hours (MPa) | 2.2 | 2.1 | 2.1 | 1.9 | 2.2 | 1.9 | 1.7 | — | — | — | 1.0 | 1.1 |
| Wear amount in the rotary corrosion test/mm | 5.7 | 5.7 | 5.7 | 5.6 | 5.5 | 5.5 | 5.6 | — | — | — | 8.7 | — |

Note)
*$Al_2O_3$ other than $SrAl_2O_4$ and $CaAl_2O_4$

The evaluation results are as shown in Table 4. Since Comparative Examples 14 to 16 showed fast hardening and thus lost operability during the kneading of monolithic refractories, it was impossible to measure strength and manufacture specimens for the rotary corrosion test.

ther including a predetermined amount of $Al_2O_3$ in Comparative Examples 19, 20, and 22 to 24, and monolithic refractories manufactured using a binder including no Sr in the chemical component of a binder in Comparative Examples 25 to 28.

TABLE 5

| | | Comparative Examples | | | | | | | | | |
|---|---|---|---|---|---|---|---|---|---|---|---|
| | | 19 | 20 | 21 | 22 | 23 | 24 | 25 | 26 | 27 | 28 |
| Raw materials for blending | $CaCO_3$ | 0.0 | 0.0 | 0.0 | 0.0 | 0.0 | 0.0 | 38.6 | 27.0 | 15.5 | 3.9 |
| | $SrCO_3$ | 3.9 | 34.9 | 48.5 | 33.9 | 19.4 | 4.8 | 0.0 | 0.0 | 0.0 | 0.0 |
| | $\alpha\text{-}Al_2O_3$ | 5.3 | 47.7 | 66.3 | 46.4 | 26.5 | 6.6 | 78.7 | 55.1 | 31.5 | 7.9 |
| $SrAl_2O_4$ | | 8 | 72 | 100 | 70 | 40 | 10 | 0 | 0 | 0 | 0 |
| $CaAl_2O_4$ | | 0 | 0 | 0 | 0 | 0 | 0 | 100 | 70 | 40 | 10 |
| $Al_2O_3$* | | 92 | 38 | 0 | 30 | 60 | 90 | 0 | 30 | 60 | 90 |
| Flexural strength after curing of 6 hours (MPa) | | 0.2 | 0.3 | 0.3 | 0.3 | 0.3 | 0.3 | 0.2 | 0.2 | 0.1 | 0.1 |
| Flexural strength after curing of 12 hours (MPa) | | 0.6 | 0.8 | 0.9 | 0.8 | 0.8 | 0.7 | 0.5 | 0.4 | 0.4 | 0.2 |
| Flexural strength after curing of 24 hours (MPa) | | 0.8 | 0.8 | 0.9 | 0.9 | 0.9 | 0.8 | 0.9 | 0.8 | 0.7 | 0.5 |
| Flexural strength after curing of 48 hours (MPa) | | 0.9 | 0.9 | 1.0 | 1.0 | 1.1 | 1.0 | 1.5 | 1.3 | 1.2 | 1.0 |
| Wear amount in the rotary corrosion test/mm | | — | — | — | — | — | — | — | — | — | — |

Note)
*$Al_2O_3$ other than $SrAl_2O_4$ and $CaAl_2O_4$

The evaluation results are as shown in Table 5. The flexural strength after curing of 6, 12, and 24 hours of Comparative Examples 19 to 24, for which a binder consisting of $SrAl_4O_7$ was used, and Comparative Examples 25 to 28, for which a binder consisting of $CaAl_4O_7$ was used, was smaller than those of Examples 1 and 11 to 19, and therefore it was not possible to sufficiently develop cured strength within a short time. As a result, it was not possible to provide specimens for the evaluation of corrosion resistance with respect to slag or molten iron by the rotary corrosion test.

[6] Monolithic Refractory Using a Mixture of $SrAl_2O_4$ and $SrAl_4O_7$ and/or $SrAl_{12}O_{19}$ as a Binder In Comparative Examples 29 to 42, the same tests were performed using monolithic refractories manufactured using a mixture of $SrAl_2O_4$ and $SrAl_4O_7$ as a binder. In addition, in Comparative Examples 43 to 45, the same tests were performed using monolithic refractories manufactured using a mixture of $SrAl_2O_4$, $SrAl_4O_7$, and $SrAl_{12}O_{19}$ as a binder. Furthermore, in Comparative Examples 46 to 49, the same tests were performed using monolithic refractories manufactured using a binder including no Sr. In any case, a predetermined amount of each of the chemical components was mixed and crushed using a batch type ball mill so as to manufacture binders and provide specimens for the tests. Table 6 shows the chemical composition, measurement results of flexural strength after curing, and results of the rotary corrosion test of each of the Comparative Examples.

TABLE 6

| | Comparative Examples | | | | | | | | | | |
|---|---|---|---|---|---|---|---|---|---|---|---|
| | 29 | 30 | 31 | 32 | 33 | 34 | 35 | 36 | 37 | 38 | 39 |
| $SrAl_2O_4$ | 4 | 31 | 90 | 50 | 10 | 54 | 30 | 6 | 36 | 20 | 4 |
| $SrAl_4O_7$ | 4 | 31 | 10 | 50 | 90 | 6 | 30 | 54 | 4 | 20 | 36 |
| $SrAl_{12}O_{19}$ | 0 | 0 | 0 | 0 | 0 | 0 | 0 | 0 | 0 | 0 | 0 |
| $CaAl_2O_4$ | 0 | 0 | 0 | 0 | 0 | 0 | 0 | 0 | 0 | 0 | 0 |
| $CaAl_4O_7$ | 0 | 0 | 0 | 0 | 0 | 0 | 0 | 0 | 0 | 0 | 0 |
| $Al_2O_3$* | 92 | 38 | 0 | 0 | 0 | 40 | 40 | 40 | 60 | 60 | 60 |
| Flexural strength after curing of 6 hours (MPa) | 0.2 | 0.4 | 0.7 | 0.5 | 0.3 | 0.5 | 0.4 | 0.2 | 0.4 | 0.3 | 0.2 |
| Flexural strength after curing of 12 hours (MPa) | 0.6 | 0.7 | 0.8 | 0.8 | 0.9 | 0.8 | 0.8 | 0.7 | 0.9 | 0.8 | 0.8 |
| Flexural strength after curing of 24 hours (MPa) | 0.8 | 0.9 | 0.8 | 1.0 | 0.9 | 0.9 | 0.9 | 0.9 | 1.1 | 0.9 | 0.9 |
| Flexural strength after curing of 48 hours (MPa) | 1.0 | 1.1 | 1.0 | 1.1 | 1.0 | 1.0 | 1.1 | 1.2 | 1.1 | 1.1 | 1.1 |
| Wear amount in the rotary corrosion test/mm | — | — | — | — | — | — | — | — | — | — | — |

| | Comparative Examples | | | | | | | | | |
|---|---|---|---|---|---|---|---|---|---|---|
| | 40 | 41 | 42 | 43 | 44 | 45 | 46 | 47 | 48 | 49 |
| $SrAl_2O_4$ | 9 | 5 | 1 | 10 | 15 | 25 | 0 | 0 | 0 | 0 |
| $SrAl_4O_7$ | 1 | 5 | 9 | 10 | 10 | 10 | 0 | 0 | 0 | 0 |
| $SrAl_{12}O_{19}$ | 0 | 0 | 0 | 20 | 25 | 30 | 0 | 0 | 0 | 0 |
| $CaAl_2O_4$ | 0 | 0 | 0 | 0 | 0 | 0 | 50 | 30 | 20 | 5 |
| $CaAl_4O_7$ | 0 | 0 | 0 | 0 | 0 | 0 | 50 | 30 | 20 | 5 |
| $Al_2O_3$* | 90 | 90 | 90 | 60 | 60 | 60 | 0 | 40 | 60 | 90 |
| Flexural strength after curing of 6 hours (MPa) | 0.2 | 0.1 | — | 0.2 | 0.3 | 0.3 | 0.3 | 0.2 | 0.1 | — |

TABLE 6-continued

| | | | | | | | | | | |
|---|---|---|---|---|---|---|---|---|---|---|
| Flexural strength after curing of 12 hours (MPa) | 0.7 | 1.1 | 1.0 | 0.5 | 0.6 | 0.7 | 1.0 | 0.9 | 0.8 | 0.4 |
| Flexural strength after curing of 24 hours (MPa) | 0.9 | 1.3 | 1.2 | 0.7 | 0.8 | 0.9 | 1.3 | 1.2 | 1.1 | 0.7 |
| Flexural strength after curing of 48 hours (MPa) | 1.2 | 1.7 | 1.6 | 1.0 | 0.9 | 0.9 | 2.0 | 1.8 | 1.5 | 1.1 |
| Wear amount in the rotary corrosion test/mm | — | — | — | — | — | — | — | — | — | — |

Note)
*$Al_2O_3$ other than $SrAl_2O_4$, $SrAl_4O_7$, $CaAl_2O_4$, and $CaAl_4O_7$ The evaluation results are as shown in Table 6. The flexural strength after curing of 6, 12, and 24 hours of Comparative Examples 29 to 49 was smaller than those of Examples 1 and 11 to 19, and therefore it was not possible to sufficiently develop cured strength within a short time. As a result, it was not possible to provide specimens for the evaluation of corrosion resistance with respect to slag or molten iron by the rotary corrosion test.

[7] Monolithic Refractory Including a Large Amount of a Mixture of $SrAl_2O_4$ and $SrAl_4O_7$ and/or $SrAl_{12}O_{19}$ In Comparative Examples 50 to 63, the same tests were performed using monolithic refractories manufactured using a mixture of $SrAl_2O_4$ and $SrAl_4O_7$ as a binder, for which the amount of the binder was 15 mass % and the amount of refractory aggregates was 85 mass %, and the amount of water added was increased to 7.5 mass % to obtain operability.

In addition, in Comparative Examples 64 to 66, the same tests were performed using monolithic refractories manufactured using a mixture of $SrAl_2O_4$, $SrAl_4O_7$, and $SrAl_{12}O_{19}$ as a binder, for which the amount of the binder was 20 mass % and the amount of refractory aggregates was 85 mass %, and the amount of water added was increased to 7.8 mass % to obtain operability.

In any case, a predetermined amount of each of the chemical components was mixed and crushed using a batch type ball mill so as to manufacture binders and provide specimens for the tests. Table 7 shows the chemical composition, measurement results of flexural strength after curing and results of the rotary corrosion test of each of the Comparative Examples.

The evaluation results are as shown in Table 7. That is, even with the binder including $SrAl_2O_4$ and $SrAl_4O_7$ and the binder including $SrAl_2O_4$, $SrAl_4O_7$, and $SrAl_{12}O_{19}$, it was possible to obtain as large a flexural strength as that of the binder including $SrAl_2O_4$ by increasing the amount of the binder added. However, in those cases, the wear amounts in the rotary corrosion test using slag became larger than that in the case of using the binder including $SrAl_2O_4$, which resulted in degraded slag resistance at a high temperature.

TABLE 7

| | Comparative Examples | | | | | | | | | | | | | | | | |
|---|---|---|---|---|---|---|---|---|---|---|---|---|---|---|---|---|---|
| | 50 | 51 | 52 | 53 | 54 | 55 | 56 | 57 | 58 | 59 | 60 | 61 | 62 | 63 | 64 | 65 | 66 |
| $SrAl_2O_4$ | 4 | 31 | 90 | 50 | 10 | 54 | 30 | 6 | 36 | 20 | 4 | 9 | 5 | 1 | 10 | 15 | 25 |
| $SrAl_4O_7$ | 4 | 31 | 10 | 50 | 90 | 6 | 30 | 54 | 4 | 20 | 36 | 1 | 5 | 9 | 10 | 10 | 10 |
| $SrAl_{12}O_{19}$ | 0 | 0 | 0 | 0 | 0 | 0 | 0 | 0 | 0 | 0 | 0 | 0 | 0 | 0 | 20 | 25 | 30 |
| $CaAl_2O_4$ | 0 | 0 | 0 | 0 | 0 | 0 | 0 | 0 | 0 | 0 | 0 | 0 | 0 | 0 | 0 | 0 | 0 |
| $CaAl_4O_7$ | 0 | 0 | 0 | 0 | 0 | 0 | 0 | 0 | 0 | 0 | 0 | 0 | 0 | 0 | 0 | 0 | 0 |
| $Al_2O_3$* | 92 | 38 | 0 | 0 | 0 | 40 | 40 | 40 | 60 | 60 | 60 | 90 | 90 | 90 | 60 | 60 | 60 |
| Flexural strength after curing of 6 hours (MPa) | 0.9 | 1.4 | 2 | 1.8 | 1.2 | 1.5 | 1.4 | 1 | 1.3 | 1.1 | 0.9 | 1.1 | 1 | 0.8 | 0.5 | 0.6 | 0.6 |
| Flexural strength after curing of 12 hours (MPa) | 1.0 | 1.8 | 2.4 | 1.9 | 1.6 | 1.8 | 1.7 | 1.5 | 1.6 | 1.4 | 1.3 | 1.2 | 1.2 | 1.0 | 0.9 | 1.0 | 1.1 |
| Flexural strength after curing of 24 hours (MPa) | 1.2 | 2.0 | 2.6 | 2.3 | 2.0 | 2.1 | 1.9 | 1.7 | 1.8 | 1.6 | 1.5 | 1.7 | 1.4 | 1.2 | 1.1 | 1.3 | 1.3 |
| Flexural strength after curing of 48 hours (MPa) | 1.5 | 2.2 | 2.9 | 2.7 | 2.3 | 2.4 | 2.2 | 2.1 | 2.1 | 1.8 | 1.7 | 2.0 | 2.1 | 1.6 | 1.4 | 1.6 | 1.7 |
| Wear amount in the rotary corrosion test/mm | 7.5 | 8.0 | 8.5 | 8.3 | 8.4 | 8.1 | 8.0 | 8.0 | 7.6 | 7.6 | 7.6 | 7.5 | 7.6 | 7.4 | 7.6 | 7.5 | 7.6 |

Note)
*$Al_2O_3$ other than $SrAl_2O_4$, $SrAl_4O_7$, $CaAl_2O_4$, and $CaAl_4O_7$ Next, the effects of the amount of $Sr_3Al_2O_6$ were reviewed.

[8] Monolithic Refractory Including $Sr_3Al_2O_6$

In the same manner as above, materials having the chemical composition of $Sr_3Al_2O_6$ only were obtained, and also the obtained materials of $Sr_3Al_2O_6$ was crushed, and a predetermined amount of the materials of $Sr_3Al_2O_6$ was added to replace the $SrAl_2O_4$ parts of the binders including a mixture of 100 parts by mass of $SrAl_2O_4$ and 0 part by mass of $Al_2O_3$, a mixture of 40 parts by mass of $SrAl_2O_4$ and 60 parts by mass of $Al_2O_3$, and a mixture of 10 parts by mass of $SrAl_2O_4$ and 90 parts by mass of $Al_2O_3$ so as to manufacture binders. In any case, a predetermined amount of each of the chemical components was mixed and crushed using a batch type ball mill so as to manufacture binders and provide specimens for the tests.

In a case in which each of the binders was used, measurement of the flexural strength after curing and the rotary corrosion test using slag were performed. Table 8 shows the chemical composition, measurement results of flexural strength after curing and results of the rotary corrosion test of each of the Examples.

TABLE 8

|  | Examples | | | Comparative Examples | | | Examples | | | | |
| --- | --- | --- | --- | --- | --- | --- | --- | --- | --- | --- | --- |
|  | 1 | 36 | 37 | 67 | 68 | 69 | 15 | 38 | 39 | 40 | 41 |
| $SrAl_2O_4$ | 100 | 99 | 97 | 95 | 93 | 91 | 40 | 39.6 | 38.8 | 38 | 37.2 |
| $Sr_3Al_2O_6$ | 0 | 1 | 3 | 5 | 7 | 9 | 0 | 0.4 | 1.2 | 2 | 2.8 |
| $Al_2O_3$* | 0 | 0 | 0 | 0 | 0 | 0 | 60 | 60 | 60 | 60 | 60 |
| Ratio of $Sr_3Al_2O_6$ added to $SrAl_2O_4$ (parts by mass) | 0 | 1 | 3 | 5 | 7 | 9 | 0 | 1 | 3 | 5 | 7 |
| Flexural strength after curing of 6 hours (MPa) | 1.6 | 1.6 | 1.7 | 0.6 | — | — | 1.3 | 1.3 | 1.2 | 1.2 | 1.1 |
| Flexural strength after curing of 12 hours (MPa) | 1.9 | 2.0 | 1.9 | 0.6 | — | — | 1.5 | 1.5 | 1.4 | 1.4 | 1.4 |
| Flexural strength after curing of 24 hours (MPa) | 2.2 | 2.2 | 2.1 | 0.7 | — | — | 1.7 | 1.6 | 1.6 | 1.5 | 1.5 |
| Flexural strength after curing of 48 hours (MPa) | 2.5 | 2.4 | 2.3 | 0.7 | — | — | 1.9 | 1.9 | 1.8 | 1.7 | 1.6 |
| Wear amount in the rotary corrosion test/mm | 6.4 | 6.5 | 6.5 | 8.1 | — | — | 5.6 | 5.6 | 5.5 | 5.6 | 5.8 |

|  | Comparative Example | Examples | | | | | |
| --- | --- | --- | --- | --- | --- | --- | --- |
|  | 70 | 18 | 42 | 43 | 44 | 45 | 46 |
| $SrAl_2O_4$ | 36.4 | 10 | 9.9 | 9.7 | 9.5 | 9.3 | 9.1 |
| $Sr_3Al_2O_6$ | 3.6 | 0 | 0.1 | 0.3 | 0.5 | 0.7 | 0.9 |
| $Al_2O_3$* | 60 | 90 | 90 | 90 | 90 | 90 | 90 |
| Ratio of $Sr_3Al_2O_6$ added to $SrAl_2O_4$ (parts by mass) | 9 | 0 | 1 | 3 | 5 | 7 | 9 |
| Flexural strength after curing of 6 hours (MPa) | 0.5 | 1.0 | 1.0 | 1.1 | 1.0 | 1.0 | 0.9 |
| Flexural strength after curing of 12 hours (MPa) | 0.6 | 1.3 | 1.3 | 1.4 | 1.4 | 1.3 | 1.3 |
| Flexural strength after curing of 24 hours (MPa) | 0.7 | 1.6 | 1.7 | 1.6 | 1.5 | 1.6 | 1.5 |
| Flexural strength after curing of 48 hours (MPa) | 0.7 | 1.8 | 1.9 | 1.9 | 1.8 | 1.8 | 1.6 |
| Wear amount in the rotary corrosion test/mm | 6.8 | 5.2 | 5.3 | 5.3 | 5.4 | 5.4 | 5.6 |

Note)
*$Al_2O_3$ other than $SrAl_2O_4$ and $Sr_3Al_2O_6$

The evaluation results are as shown in Table 8.

That is, in Comparative Examples 67 and 70, the operability of the monolithic refractories was degraded during the kneading, which led to inferior pouring into the test specimen mold form, and therefore the cured flexural strength was degraded and the wear amount of the rotary corrosion test deteriorated.

In addition, in Comparative Examples 68 and 69, the materials were hardened during the kneading of the monolithic refractories, and therefore test specimens could not be manufactured, which made it impossible to perform each of the tests.

On the other hand, it has been clarified that Examples 36 to 46 obtained strength developing property and slag resistance as excellent as those of the cases including no $Sr_3Al_2O_6$ with the binders including $Sr_3Al_2O_6$ added. From the above test results, it is possible to obtain excellent characteristics in any amounts of a binder mixed by setting the amount of $Sr_3Al_2O_6$ to 3 parts by mass or less of the amount of $SrAl_2O_4$.

Next, the mixing ratio of refractory aggregates and binders was reviewed.

[9] Monolithic Refractory Using a Varied Amount of a Binder Having the Chemical Composition of $SrAl_2O_4$ In Examples 47 to 54, in monolithic refractories manufactured using a binder including a mixture of 40 parts by mass of $SrAl_2O_4$ and 60 parts by mass of $Al_2O_3$, the tests were performed with a varied amount of the binder in a case in which the total of the binder and refractory aggregates was made to be 100 parts by mass.

For each of the cases, measurement of the flexural strength after curing and the rotary corrosion test using slag were performed as described above. Table 9 shows the chemical composition, measurement results of flexural strength after curing and results of the rotary corrosion test of each of the Examples.

TABLE 9

|  |  | Examples | | | | | | | | Comparative Example |
| --- | --- | --- | --- | --- | --- | --- | --- | --- | --- | --- |
|  |  | 47 | 48 | 49 | 50 | 51 | 52 | 53 | 54 | 71 |
| Raw materials for blending | $CaCO_3$ | 0.0 | 0.0 | 0.0 | 0.0 | 0.0 | 0.0 | 0.0 | 0.0 | 0.0 |
|  | $SrCO_3$ | 28.9 | 28.9 | 28.9 | 28.9 | 28.9 | 28.9 | 28.9 | 28.9 | 28.9 |
|  | α-$Al_2O_3$ | 19.8 | 19.8 | 19.8 | 19.8 | 19.8 | 19.8 | 19.8 | 19.8 | 19.8 |
|  | $SrAl_2O_4$ | 40 | 40 | 40 | 40 | 40 | 40 | 40 | 40 | 40 |

TABLE 9-continued

|  | Examples | | | | | | | | Comparative Example |
|---|---|---|---|---|---|---|---|---|---|
|  | 47 | 48 | 49 | 50 | 51 | 52 | 53 | 54 | 71 |
| $Al_2O_3$* | 60 | 60 | 60 | 60 | 60 | 60 | 60 | 60 | 60 |
| Amount of additives added (mass %) | 0.2 | 0.3 | 0.5 | 5 | 10 | 12 | 16 | 20 | 25 |
| Flexural strength after curing of 6 hours (MPa) | 0.6 | 0.8 | 0.9 | 1.2 | 1.5 | 1.6 | 1.8 | 1.9 | 2.2 |
| Flexural strength after curing of 12 hours (MPa) | 1 | 1.2 | 1.3 | 1.4 | 1.7 | 1.8 | 2.2 | 2.4 | 2.7 |
| Flexural strength after curing of 24 hours (MPa) | 1.2 | 1.4 | 1.5 | 1.6 | 2.0 | 2.1 | 2.4 | 2.5 | 2.9 |
| Flexural strength after curing of 48 hours (MPa) | 1.3 | 1.7 | 1.7 | 1.8 | 2.2 | 2.3 | 2.6 | 2.7 | 3.2 |
| Wear amount in the rotary corrosion test /mm | 4.9 | 4.9 | 5.0 | 5.2 | 6.0 | 6.1 | 6.2 | 6.5 | 7.2 |

Note)
*$Al_2O_3$ other than $SrAl_2O_4$

The evaluation results are as shown in Table 9.

That is, in any of the cases of Examples 47 to 54, it was possible to obtain satisfactory results in both the flexural strength after curing and the rotary corrosion test by using the binder according to the present invention.

In addition, in Comparative Example 71, a large cured flexural strength could be obtained, but the slag resistance was degraded. From the above, it has been clarified that the amount of the binder according to the present invention used is preferably from 0.2 parts by mass to 20 parts by mass with respect to 100 parts by mass of the binder and refractory aggregates in total.

That is, when the amount of the binder was from 0.5 parts by mass to 12 parts by mass, cured strength and slag resistance became excellent.

the ultrafine alumina powder of 1 μm or less in Comparative Example A and a binder including 80 mass % of the ultrafine alumina powder of 1 μm or less in Comparative Example B.

In all tests, a binder including a mixture of 40 parts by mass of $SrAl_2O_4$ and 60 parts by mass of $\alpha$-$Al_2O_3$ was used, and the amount of fused alumina of from 75 μm to 5 mm was adjusted to cover a changed amount of the ultrafine alumina powder of 1 μm or less so as to manufacture monolithic refractories with the same total mass of alumina. Further, the ratio of the binder, magnesia, silica flower, and vinylon fiber added was not varied. Table 10 shows the amount of sintered alumina of 1 μm or less, the amount of fused alumina of from 75 μm to 5 mm, measurement results of flexural strength after curing and rotary corrosion test results in the monolithic refractory of each of the Examples.

TABLE 10

|  | Examples | | | | | | | Comparative Examples | |
|---|---|---|---|---|---|---|---|---|---|
|  | A | B | C | D | 15 | E | F | A | B |
| $SrAl_2O_4$ | 40.0 | 40.0 | 40.0 | 40.0 | 40.0 | 40.0 | 40.0 | 40.0 | 40.0 |
| $Al_2O_3$* | 60.0 | 60.0 | 60.0 | 60.0 | 60.0 | 60.0 | 60.0 | 60.0 | 60.0 |
| Amount of sintered alumina *[2] of 1 μm or less (mass %) | 2 | 5 | 10 | 30 | 46 | 50 | 70 | 0 | 80 |
| Amount of fused alumina *[2] of 75 μm to 5 mm (mass %) | 83.6 | 80.6 | 75.6 | 55.6 | 39.6 | 35.6 | 15.6 | 85.6 | 5.56 |
| Flexural strength after curing of 6 hours (MPa) | 1 | 1.2 | 1.2 | 1.3 | 1.3 | 1.4 | 1.5 | 0.6 | 1.6 |
| Flexural strength after curing of 12 hours (MPa) | 1.2 | 1.3 | 1.4 | 1.5 | 1.5 | 1.6 | 1.7 | 0.7 | 1.7 |
| Flexural strength after curing of 24 hours (MPa) | 1.4 | 1.5 | 1.6 | 1.7 | 1.7 | 1.7 | 1.9 | 1.0 | 2.0 |
| Flexural strength after curing of 48 hours (MPa) | 1.8 | 1.9 | 1.9 | 1.9 | 1.9 | 2.0 | 2.1 | 1.4 | 2.2 |
| Wear amount in the rotary corrosion test/mm | 5.8 | 5.9 | 5.7 | 5.5 | 5.6 | 5.6 | 5.8 | — | 6.8 |

Note)
*[2] Mixed ratio to unshaped refractory (total of binder and refractory aggregate)

[10] Monolithic Refractory with a Varied Amount of Ultrafine Alumina Powder of 1 μm or Less.

In Examples A to F, the same tests were performed using monolithic refractories manufactured with a varied amount of ultrafine alumina powder of 1 μm or less of from 2 mass % to 70 mass %.

In addition, the same tests were performed using monolithic refractories manufactured using a binder not including The evaluation results are as shown in Table 10.

That is, Examples A to F obtained higher flexural strength after curing than that of Comparative Example A in any of the curing times, which clarified that cured strength developing property was improved. In addition, Examples A to F clearly showed smaller wear amount than that of Comparative Example B in the rotary corrosion test using slag, which clarified that slag resistance at a high temperature was excellent. From the above, it has been clarified that the amount of fine powder of 1 μm or less in monolithic refractories using the binder of the present invention is preferably from 2 mass % to 70 mass %, and more preferably from 5 mass % to 50 mass %.

[11] Monolithic Refractory to Which a Dispersant and/or a Hardening Retardant are Added In Examples 55 to 124, monolithic refractories were manufactured by using a binder including a mixture of 40 parts by mass of $SrAl_2O_4$ and 60 parts by mass of $\alpha$-$Al_2O_3$, and mixing a predetermined amount of at least one kind of a variety of dispersants, hardening retardants and hardening accelerators in outer percentage, and then the tests were performed.

In addition, in Comparative Examples 72 to 88, monolithic refractories were manufactured by using a binder including no Sr and mixing at least one kind of a dispersant, a hardening retardant and a hardening accelerator in the same manner, and then the tests were performed. Further, when mixing a dispersant and/or a hardening retardant, the amount of water added was reduced to 6.2 parts by mass with respect to 100 parts by mass of the mixture of the binder and refractory aggregates, and then the test was performed. In addition, when mixing only a hardening accelerator, as usual, 6.8 parts by mass of water was added and the test was performed. A powder dispersant, a hardening retardant, and a hardening accelerator were used after being mixed with the binder and refractory aggregate using an omni mixer. For liquid dispersants, the mass of solid components included was considered as the amount added, and adjustment was performed so as to obtain a predetermined amount of water by reducing from the amount of water to be added by the mass portion of the solvent parts. In addition, liquid dispersants were used after being mixed with kneading water.

Meanwhile, in the embodiments, a sodium polyacrylate reagent, which is a polycarboxylic acid-based dispersant, was used as the dispersant A; "TIGHTLOCK" (trade name, manufactured by Kao Corporation), which is a polyether-based dispersant, was used as the dispersant B; sodium tripolyphosphate (primary reagent), which is a phosphate-based dispersant, was used as the dispersant C; trisodium citrate dihydrate (primary reagent), which is an oxycarboxylic acid, was used as the dispersant D; "FT-3S" (with a solid content of 33 mass %) (trade name, manufactured by Grace Chemical Co., Ltd.), which is a melamine-based dispersant, was used as the dispersant E; "MIGHTY 150" (with a solid content of 40 mass %) (trade name, manufactured by Kao Corporation), which is a naphthalene-based dispersant, was used as the dispersant F; "VANILLEX" (trade name, manufactured by Nippon Paper Chemicals Co., Ltd.), which is a lignin-based dispersant, was used as the dispersant G; boric acid (special grade chemical), which is one of boric acid groups, was used as the hardening retardant a; sodium silicofluoride (special grade chemical), which is a silicofluoride, was used as the hardening retardant b; lithium citrate (primary reagent), which is one of lithium salts, was used as the hardening accelerator $\alpha$; and sodium aluminate (primary reagent), which is one of aluminates, was used as the hardening accelerator $\beta$.

For each of the cases, measurement of the flexural strength after curing and the rotary corrosion test using slag were performed as described above. Table 11 shows the type, amount used, measurement result of flexural strength after curing, and results of the rotary corrosion test of the dispersant, hardening retardant, and hardening accelerator in each of the Examples.

TABLE 11

| | Examples | | | | | | | | | | | | | | | |
|---|---|---|---|---|---|---|---|---|---|---|---|---|---|---|---|---|
| | 55 | 56 | 57 | 58 | 59 | 60 | 61 | 62 | 63 | 64 | 65 | 66 | 67 | 68 | 69 | 70 |
| $SrAl_2O_4$ | 40.0 | 40.0 | 40.0 | 40.0 | 40.0 | 40.0 | 40.0 | 40.0 | 40.0 | 40.0 | 40.0 | 40.0 | 40.0 | 40.0 | 40.0 | 40.0 |
| $CaAl_2O_4$ | — | — | — | — | — | — | — | — | — | — | — | — | — | — | — | — |
| $Al_2O_3$* | 60.0 | 60.0 | 60.0 | 60.0 | 60.0 | 60.0 | 60.0 | 60.0 | 60.0 | 60.0 | 60.0 | 60.0 | 60.0 | 60.0 | 60.0 | 60.0 |
| Type of dispersant | A | A | A | A | B | B | B | B | C | C | C | C | D | D | D | D |
| Amount of dispersant added (parts by mass) | 0.01 | 0.05 | 0.2 | 0.5 | 0.01 | 0.05 | 0.2 | 0.5 | 0.01 | 0.05 | 0.2 | 0.5 | 0.01 | 0.05 | 0.2 | 0.5 |
| Type of hardening retardant | — | — | — | — | — | — | — | — | — | — | — | — | — | — | — | — |
| Amount of hardening retardant added (parts by mass) | | | | | | | | | | | | | | | | |
| Type of hardening accelerator | | | | | | | | | | | | | | | | |
| Amount of hardening accelerator added (parts by mass) | | | | | | | | | | | | | | | | |
| Flexural strength after curing of 6 hours (MPa) | 1.7 | 1.7 | 1.6 | 1.5 | 1.8 | 1.7 | 1.5 | 1.3 | 1.3 | 1.6 | 1.8 | 1.6 | 1.3 | 1.7 | 1.7 | 1.8 |
| Flexural strength after curing of 12 hours (MPa) | 2.0 | 1.9 | 1.9 | 1.8 | 2.0 | 1.9 | 1.8 | 1.8 | 1.6 | 1.8 | 2.0 | 1.9 | 1.6 | 1.8 | 1.9 | 2.1 |
| Flexural strength after curing of 24 hours (MPa) | 2.3 | 2.3 | 2.4 | 2.1 | 2.3 | 2.2 | 2.2 | 2.1 | 1.7 | 1.9 | 2.1 | 2.0 | 1.7 | 2.2 | 2.1 | 2.3 |
| Flexural strength after curing of 48 hours (MPa) | 2.3 | 2.4 | 2.4 | 2.3 | 2.3 | 2.3 | 2.2 | 2.2 | 1.8 | 2.0 | 2.2 | 2.1 | 1.7 | 2.2 | 2.2 | 2.3 |
| Wear amount in the rotary corrosion test/mm | 5.4 | 5.5 | 5.5 | 5.4 | 5.4 | 5.4 | 5.4 | 5.5 | 5.8 | 5.5 | 5.6 | 5.5 | 5.7 | 5.4 | 5.4 | 5.5 |

| | Examples | | | | | | | | | | | | | | |
|---|---|---|---|---|---|---|---|---|---|---|---|---|---|---|---|
| | 71 | 72 | 73 | 74 | 75 | 76 | 77 | 78 | 79 | 80 | 81 | 82 | 83 | 84 | 85 |
| $SrAl_2O_4$ | 40.0 | 40.0 | 40.0 | 40.0 | 40.0 | 40.0 | 40.0 | 40.0 | 40.0 | 40.0 | 40.0 | 40.0 | 40.0 | 40.0 | 40.0 |
| $CaAl_2O_4$ | — | — | — | — | — | — | — | — | — | — | — | — | — | — | — |
| $Al_2O_3$* | 60.0 | 60.0 | 60.0 | 60.0 | 60.0 | 60.0 | 60.0 | 60.0 | 60.0 | 60.0 | 60.0 | 60.0 | 60.0 | 60.0 | 60.0 |
| Type of dispersant | E | E | E | E | F | F | F | F | G | G | G | G | — | — | — |
| Amount of dispersant added (parts by mass) | 0.01 | 0.05 | 0.2 | 0.5 | 0.01 | 0.05 | 0.2 | 0.5 | 0.01 | 0.05 | 0.2 | 0.5 | | | |

TABLE 11-continued

| Type of hardening retardant | — | — | — | — | — | — | — | — | — | — | — | — | a | a | a |
|---|---|---|---|---|---|---|---|---|---|---|---|---|---|---|---|
| Amount of hardening retardant added (parts by mass) | — | — | — | — | — | — | — | — | — | — | — | — | 0.01 | 0.01 | 0.05 |
| Type of hardening accelerator | | | | | | | | | | | | | | | |
| Amount of hardening accelerator added (parts by mass) | | | | | | | | | | | | | | | |
| Flexural strength after curing of 6 hours (MPa) | 1.4 | 1.6 | 1.7 | 1.5 | 1.4 | 1.7 | 1.8 | 1.7 | 1.4 | 1.6 | 1.8 | 1.6 | 1.2 | 1.5 | 1.5 |
| Flexural strength after curing of 12 hours (MPa) | 1.6 | 1.9 | 1.9 | 1.7 | 1.6 | 1.9 | 2.0 | 1.9 | 1.6 | 1.9 | 2.0 | 1.8 | 1.5 | 1.8 | 1.7 |
| Flexural strength after curing of 24 hours (MPa) | 1.7 | 2.1 | 2.1 | 2.0 | 1.7 | 1.9 | 2.1 | 2.1 | 1.7 | 1.9 | 2.1 | 2.0 | 1.6 | 2.1 | 1.9 |
| Flexural strength after curing of 48 hours (MPa) | 1.7 | 2.1 | 2.2 | 2.1 | 1.8 | 2.0 | 2.2 | 2.1 | 1.8 | 2.0 | 2.2 | 2.0 | 1.6 | 2.3 | 2.2 |
| Wear amount in the rotary corrosion test/mm | 5.8 | 5.5 | 5.4 | 5.5 | 5.7 | 5.4 | 5.5 | 5.5 | 5.9 | 5.5 | 5.4 | 5.5 | 5.9 | 5.5 | 5.4 |

| | Examples | | | | | | | | | | | | | | |
|---|---|---|---|---|---|---|---|---|---|---|---|---|---|---|---|
| | 86 | 87 | 88 | 89 | 90 | 91 | 92 | 93 | 94 | 95 | 96 | 97 | 98 | 99 | 100 |
| $SrAl_2O_4$ | 40.0 | 40.0 | 40.0 | 40.0 | 40.0 | 40.0 | 40.0 | 40.0 | 40.0 | 40.0 | 40.0 | 40.0 | 40.0 | 40.0 | 40.0 |
| $CaAl_2O_4$ | — | — | — | — | — | — | — | — | — | — | — | — | — | — | — |
| $Al_2O_3$* | 60.0 | 60.0 | 60.0 | 60.0 | 60.0 | 60.0 | 60.0 | 60.0 | 60.0 | 60.0 | 60.0 | 60.0 | 60.0 | 60.0 | 60.0 |
| Type of dispersant | — | — | — | — | — | — | — | — | — | — | — | — | — | A | A |
| Amount of dispersant added (parts by mass) | — | — | — | — | — | — | — | — | — | — | — | — | — | 0.05 | 0.05 |
| Type of hardening retardant | a | b | b | b | b | — | — | — | — | — | — | — | — | a | a |
| Amount of hardening retardant added (parts by mass) | 0.2 | 0.01 | 0.01 | 0.05 | 0.2 | — | — | — | — | — | — | — | — | 0.01 | 0.01 |
| Type of hardening accelerator | | | | | | α | α | α | α | β | β | β | β | | |
| Amount of hardening accelerator added (parts by mass) | | | | | | 0.01 | 0.01 | 0.05 | 0.2 | 0.01 | 0.01 | 0.05 | 0.2 | | |
| Flexural strength after curing of 6 hours (MPa) | 1.3 | 1.6 | 1.4 | 1.3 | 1.2 | 1.5 | 1.5 | 1.7 | 1.8 | 1.5 | 1.6 | 1.6 | 1.7 | 1.4 | 1.5 |
| Flexural strength after curing of 12 hours (MPa) | 1.4 | 1.8 | 1.7 | 1.5 | 1.3 | 1.6 | 1.6 | 1.8 | 1.9 | 1.5 | 1.7 | 1.8 | 1.8 | 1.6 | 1.8 |
| Flexural strength after curing of 24 hours (MPa) | 1.9 | 2.2 | 2.2 | 2.1 | 2.1 | 1.7 | 1.7 | 1.8 | 1.7 | 1.7 | 1.7 | 1.8 | 1.7 | 2.0 | 2.0 |
| Flexural strength after curing of 48 hours (MPa) | 2.1 | 2.3 | 2.4 | 2.3 | 2.4 | 1.8 | 1.7 | 1.7 | 1.7 | 1.7 | 1.8 | 1.6 | 1.6 | 2.2 | 2.2 |
| Wear amount in the rotary corrosion test/mm | 5.5 | 5.5 | 5.4 | 5.3 | 5.4 | 5.7 | 5.7 | 5.8 | 5.9 | 5.6 | 5.8 | 5.8 | 5.9 | 5.4 | 5.3 |

| | Examples | | | | | | | | | | | | | | |
|---|---|---|---|---|---|---|---|---|---|---|---|---|---|---|---|
| | 101 | 102 | 103 | 104 | 105 | 106 | 107 | 108 | 109 | 110 | 111 | 112 | 113 | 114 | 115 |
| $SrAl_2O_4$ | 40.0 | 40.0 | 40.0 | 40.0 | 40.0 | 40.0 | 40.0 | 40.0 | 40.0 | 40.0 | 40.0 | 40.0 | 40.0 | 40.0 | 40.0 |
| $CaAl_2O_4$ | — | — | — | — | — | — | — | — | — | — | — | — | — | — | — |
| $Al_2O_3$* | 60.0 | 60.0 | 60.0 | 60.0 | 60.0 | 60.0 | 60.0 | 60.0 | 60.0 | 60.0 | 60.0 | 60.0 | 60.0 | 60.0 | 60.0 |
| Type of dispersant | A | A | A | A | A | A | A | A | A | A | A | A | A | A | — |
| Amount of dispersant added (parts by mass) | 0.05 | 0.05 | 0.05 | 0.05 | 0.05 | 0.05 | 0.05 | 0.05 | 0.05 | 0.05 | 0.05 | 0.05 | 0.05 | 0.05 | — |
| Type of hardening retardant | a | a | b | b | b | b | — | — | — | — | — | — | — | — | a |
| Amount of hardening retardant added (parts by mass) | 0.05 | 0.2 | 0.01 | 0.01 | 0.05 | 0.2 | — | — | — | — | — | — | — | — | 0.01 |
| Type of hardening accelerator | | | | | | | α | α | α | α | β | β | β | β | α |
| Amount of hardening accelerator added (parts by mass) | | | | | | | 0.01 | 0.01 | 0.05 | 0.2 | 0.01 | 0.01 | 0.05 | 0.2 | 0.01 |
| Flexural strength after curing of 6 hours (MPa) | 1.4 | 1.2 | 1.5 | 1.4 | 1.3 | 1.1 | 2 | 2.2 | 2.4 | 2.4 | 1.8 | 1.9 | 2.1 | 2.1 | 1.7 |
| Flexural strength after curing of 12 hours (MPa) | 1.6 | 1.4 | 1.8 | 1.6 | 1.5 | 1.3 | 2.3 | 2.4 | 2.4 | 2.3 | 2.1 | 2.2 | 2.2 | 2.1 | 1.9 |
| Flexural strength after curing of 24 hours (MPa) | 2.0 | 1.8 | 2.1 | 2.0 | 1.9 | 1.9 | 2.3 | 2.5 | 2.4 | 2.4 | 2.2 | 2.3 | 2.2 | 2.2 | 2.0 |
| Flexural strength after curing of 48 hours (MPa) | 2.2 | 2.1 | 2.3 | 2.2 | 2.3 | 2.3 | 2.4 | 2.5 | 2.3 | 2.2 | 2.2 | 2.4 | 2.3 | 2.3 | 2.1 |
| Wear amount in the rotary corrosion test/mm | 5.5 | 5.4 | 5.4 | 5.3 | 5.4 | 5.4 | 5.5 | 5.4 | 5.5 | 5.5 | 5.5 | 5.4 | 5.5 | 5.6 | 5.5 |

| | Examples | | | | | | | | | Comparative Examples | | | | | |
|---|---|---|---|---|---|---|---|---|---|---|---|---|---|---|---|
| | 116 | 117 | 118 | 119 | 120 | 121 | 122 | 123 | 124 | 72 | 73 | 74 | 75 | 76 | 77 |
| $SrAl_2O_4$ | 40.0 | 40.0 | 40.0 | 40.0 | 40.0 | 40.0 | 40.0 | 40.0 | 40.0 | — | — | — | — | — | — |
| $CaAl_2O_4$ | — | — | — | — | — | — | — | — | — | 40.0 | 40.0 | 40.0 | 40.0 | 40.0 | 40.0 |
| $Al_2O_3$* | 60.0 | 60.0 | 60.0 | 60.0 | 60.0 | 60.0 | 60.0 | 60.0 | 60.0 | 60.0 | 60.0 | 60.0 | 60.0 | 60.0 | 60.0 |

TABLE 11-continued

| Type of dispersant | — | — | — | — | — | — | — | A | A | A | B | C | D | E | F |
|---|---|---|---|---|---|---|---|---|---|---|---|---|---|---|---|
| Amount of dispersant added (parts by mass) | — | — | — | — | — | — | — | 0.05 | 0.05 | 0.05 | 0.05 | 0.05 | 0.05 | 0.05 | 0.05 |
| Type of hardening retardant | a | a | a | a | a | a | a | a | a | — | — | — | — | — | — |
| Amount of hardening retardant added (parts by mass) | 0.01 | 0.01 | 0.01 | 0.01 | 0.01 | 0.01 | 0.01 | 0.01 | 0.01 | — | — | — | — | — | — |
| Type of hardening accelerator | α | α | α | β | β | β | β | α | β | | | | | | |
| Amount of hardening accelerator added (parts by mass) | 0.01 | 0.05 | 0.2 | 0.01 | 0.01 | 0.05 | 0.2 | 0.01 | 0.01 | | | | | | |
| Flexural strength after curing of 6 hours (MPa) | 1.8 | 2 | 2.2 | 1.6 | 1.7 | 1.8 | 2.1 | 1.9 | 1.8 | 0.6 | 0.4 | 0.6 | 0.6 | 0.5 | 0.6 |
| Flexural strength after curing of 12 hours (MPa) | 2.0 | 2.1 | 2.3 | 2.0 | 2.0 | 2.0 | 2.2 | 2.2 | 2.2 | 1.0 | 0.8 | 1.1 | 1.1 | 0.9 | 1.0 |
| Flexural strength after curing of 24 hours (MPa) | 2.1 | 2.1 | 2.2 | 2.1 | 2.0 | 2.1 | 2.2 | 2.4 | 2.3 | 1.5 | 1.3 | 1.7 | 1.6 | 1.5 | 1.6 |
| Flexural strength after curing of 48 hours (MPa) | 2.2 | 2.1 | 2.2 | 2.2 | 2.1 | 2.1 | 2.3 | 2.4 | 2.5 | 1.9 | 1.8 | 2.0 | 1.9 | 1.9 | 2.0 |
| Wear amount in the rotary corrosion test/mm | 5.5 | 5.6 | 5.7 | 5.4 | 5.5 | 5.7 | 5.7 | 5.5 | 5.4 | 7.6 | 7.8 | 7.5 | 7.5 | 7.4 | 7.5 |

| | Comparative Examples | | | | | | | | | | |
|---|---|---|---|---|---|---|---|---|---|---|---|
| | 78 | 79 | 80 | 81 | 82 | 83 | 84 | 85 | 86 | 87 | 88 |
| $SrAl_2O_4$ | — | — | — | — | — | — | — | — | — | — | — |
| $CaAl_2O_4$ | 40.0 | 40.0 | 40.0 | 40.0 | 40.0 | 40.0 | 40.0 | 40.0 | 40.0 | 40.0 | 40.0 |
| $Al_2O_3$* | 60.0 | 60.0 | 60.0 | 60.0 | 60.0 | 60.0 | 60.0 | 60.0 | 60.0 | 60.0 | 60.0 |
| Type of dispersant | G | — | — | | | A | A | A | A | A | A |
| Amount of dispersant added (parts by mass) | 0.05 | — | — | | | 0.05 | 0.05 | 0.05 | 0.05 | 0.05 | 0.05 |
| Type of hardening retardant | — | a | b | | | a | b | — | — | α | β |
| Amount of hardening retardant added (parts by mass) | — | 0.01 | 0.01 | | | 0.01 | 0.01 | — | — | 0.01 | 0.01 |
| Type of hardening accelerator | | | | α | β | | | α | β | α | β |
| Amount of hardening accelerator added (parts by mass) | | | | 0.01 | 0.01 | | | 0.01 | 0.01 | 0.01 | 0.01 |
| Flexural strength after curing of 6 hours (MPa) | 0.6 | 0.5 | 0.3 | 0.7 | 0.6 | 0.5 | 0.3 | 0.9 | 0.7 | 0.6 | 0.5 |
| Flexural strength after curing of 12 hours (MPa) | 0.9 | 0.8 | 0.6 | 1.1 | 1.1 | 0.8 | 0.6 | 1.5 | 1.4 | 1.3 | 1.2 |
| Flexural strength after curing of 24 hours (MPa) | 1.6 | 1.3 | 1.0 | 1.4 | 1.4 | 1.3 | 0.9 | 1.8 | 1.6 | 1.8 | 1.5 |
| Flexural strength after curing of 48 hours (MPa) | 1.9 | 1.9 | 1.6 | 1.7 | 1.6 | 1.7 | 1.5 | 2.0 | 1.9 | 1.9 | 1.9 |
| Wear amount in the rotary corrosion test/mm | 7.5 | 7.9 | 8.0 | 8.3 | 8.3 | 7.8 | 7.9 | 7.5 | 7.6 | 7.8 | 7.9 |

Note)
*$Al_2O_3$ other than $SrAl_2O_4$ and $CaAl_2O_4$

The evaluation results are as shown in Table 11.

That is, in the cases of Examples 55 to 90 and 99 to 106, in which a dispersant and/or a hardening retardant were used, irrespective of the reduced amount of water added to the monolithic refractories, hardening of the materials was not observed in any of the Examples during the kneading or the manufacture of test specimens, and it was possible to manufacture test specimens. In addition, since monolithic refractories were manufactured with a reduced amount of water added, an increase in cured flexural strength and a decrease in the wear amount in the rotary corrosion test using slag could be obtained compared to Example 15 using the same binder but no dispersant and/or hardening retardant.

In Examples 91 to 98 using only a hardening accelerator, since a part of the materials was hardened during kneading in all cases, materials were taken from uncured parts and then cured so as to manufacture test specimens for the flexural strength measurement and the rotary corrosion test.

In Examples 91 to 98, the cured strength was further increased after 6 hours and 12 hours compared to Example 15 including no hardening accelerator added, which clarified that Examples 91 to 98 are superior in terms of early strength developing property. In addition, the wear amount became almost the same in the rotary corrosion test using slag, which clarified that Examples 91 to 98 are excellent in terms of slag resistance at a high temperature.

In Examples 107 to 124 in which at least a hardening accelerator was used and, furthermore, at least one of a dispersant and a hardening retardant was used, regardless of the reduced amount of water added to monolithic refractories, hardening of the materials was not observed in any of the Examples during the kneading and the manufacture of test specimens, and it was possible to manufacture test specimens. In addition, since a hardening accelerator was used, the cured flexural strength after 6 hours and 12 hours was increased compared to Examples 55 to 90 and 99 to 106, in which the same binder, dispersant, and/or hardening retardant were used, which clarified that Examples 107 to 124 are superior in terms of early strength developing properties.

Examples 55 to 124 obtained higher flexural strength in all curing times than Comparative Examples 72 to 88, which were manufactured by using a binder including no Sr as a binder component and by adding at least one kind of a dispersant, a hardening retardant and a hardening accelerator in the same manner, which clarified that Examples 55 to 124 are excellent in terms of cured strength developing property. In particular, the cured strength after curing of 6 hours was remarkably large compared with the Comparative Examples, and the early strength developing property was excellent and also the wear amount in the rotary corrosion test using slag was clearly small, which clarified that Examples 55 to 124 are excellent in terms of slag resistance at a high temperature.

As described above, all Examples obtained more satisfactory cured flexural strength and slag resistance at 1600° C. than the Comparative Examples, which clarified that the cured strength developing property and the tolerance at places that come into contact with molten iron or slag are improved.

Thus far, the preferable embodiments of the present invention have been described in detail with reference to the accompanying drawings, but the present invention is not limited to such examples, and thus any persons with common knowledge in the technical field of the present invention can imagine a variety of modifications within the technical scope of the present invention described in claims, and therefore such modifications are not to be regarded as a departure from the scope of the present invention.

According to the binder for monolithic refractories according to the present invention, since it is possible to obtain a larger strength of hardened bodies faster than alumina cement in the conventional technique, it is possible to expect the effects of excellent strength developing property and productivity improvement by the shortening of curing time. Furthermore, according to the binder for monolithic refractories according to the present invention, it is possible to develop the effects of excellent high temperature corrosion resistance with respect to slag, molten iron, or the like and of the service life expansion of monolithic refractories lined in kilns used in a high temperature.

REFERENCE SYMBOL LIST

1: REFRACTORY (TEST SPECIMEN)
2: PROTECTION PLATE
3: BURNER
4: SLAG
5: FILLING MATERIAL

What is claimed is:

1. A monolithic refractory, comprising a binder for monolithic refractories and a refractory aggregate, the binder consisting of $SrAl_2O_4$ and 5 mass % or less of unavoidable impurities as a remainder, the refractory aggregate comprising an ultrafine alumina powder having a particle diameter of 1 μm or less, wherein
  a crystallite diameter of the $SrAl_2O_4$ is from 40 nm to 80 nm, and
  the binder is present in an amount of from 0.5 parts by mass to 12 parts by mass with respect to 100 parts by mass of a total amount of the binder for monolithic refractories and the refractory aggregate.

2. A monolithic refractory, comprising a binder for monolithic refractories and a refractory aggregate, the binder comprising a mixture of $Al_2O_3$ and $SrAl_2O_4$, the refractory aggregate comprising an ultrafine alumina powder having a particle diameter of 1 μm or less, wherein
  a crystallite diameter of the $SrAl_2O_4$ is from 40 nm to 80 nm, and
  the binder is present in an amount of from 0.5 parts by mass to 12 parts by mass with respect to 100 parts by mass of a total amount of the binder for monolithic refractories and the refractory aggregate.

3. The monolithic refractory according to claim 2, wherein the mixture comprises from 10 mass % to 60 mass % of the $SrAl_2O_4$ and from 40 mass % to 90 mass % of the $Al_2O_3$.

4. The monolithic refractory according to claim 2, wherein the mixture comprises from 20 mass % to 50 mass % of the $SrAl_2O_4$ and from 50 mass % to 80 mass % of the $Al_2O_3$.

5. The monolithic refractory according to any one of claims 2, 3 and 4, wherein the binder further comprises either a dispersant or a hardening retardant.

6. The monolithic refractory according to any one of claims 1, 2, 3 and 4, wherein
  $Sr_3Al_2O_6$ is present as an inevitable impurity in an amount of 3 parts by mass or less with respect to 100 parts by mass of $SrAl_2O_4$.

7. The monolithic refractory according to any one of claims 1, 2, 3 and 4, further comprising at least one of a dispersant, a hardening retardant, and a hardening accelerator.

8. The monolithic refractory according to claim 7, wherein a hardening accelerator is added.

9. The monolithic refractory according to claim 7, wherein
  the dispersant comprises at least one dispersant selected from a group consisting of a polycarbonate-based dispersant, a phosphate-based dispersant, oxycarboxylic acid, a melamine-based dispersant, a naphthalene-based dispersant, and a lignin sulfonic acid-based dispersant;
  the hardening accelerator is at least either a lithium salt or an aluminate; and
  the hardening retardant is at least either boric acid group or silicofluoride.

10. The monolithic refractory according to claim 1, wherein
  the unavoidable impurities include at least one impurity selected from a group consisting of $Al_2O_3$, $SiO_2$, $TiO_2$, $Fe_2O_3$, MgO, SrO, and a strontium aluminate excluding the $SrAl_2O_4$.

11. The monolithic refractory according to claim 8, wherein
  the dispersant comprises at least one dispersant selected from a group consisting of a polycarbonate-based dispersant, a phosphate-based dispersant, oxycarboxylic acid, a melamine-based dispersant, a naphthalene-based dispersant, and a lignin sulfonic acid-based dispersant;
  the hardening accelerator is at least either a lithium salt or an aluminate; and
  the hardening retardant is at least either boric acid group or silicofluoride.

* * * * *

UNITED STATES PATENT AND TRADEMARK OFFICE
CERTIFICATE OF CORRECTION

PATENT NO.       : 8,673,797 B2  
APPLICATION NO.  : 12/998440  
DATED            : March 18, 2014  
INVENTOR(S)      : Yoshitoshi Saito et al.

Page 1 of 1

It is certified that error appears in the above-identified patent and that said Letters Patent is hereby corrected as shown below:

In the Specification

Column 15, line 26, change "using A powder" to -- using a powder --;

Column 31, line 61, change "1 μm or Less" to -- 1 μm or less --.

Signed and Sealed this
Second Day of September, 2014

Michelle K. Lee
*Deputy Director of the United States Patent and Trademark Office*

UNITED STATES PATENT AND TRADEMARK OFFICE
CERTIFICATE OF CORRECTION

PATENT NO.        : 8,673,797 B2                                        Page 1 of 1
APPLICATION NO.   : 12/998440
DATED             : March 18, 2014
INVENTOR(S)       : Saito et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 143 days.

Signed and Sealed this

Twenty-ninth Day of September, 2015

Michelle K. Lee
*Director of the United States Patent and Trademark Office*